United States Patent
Shi et al.

(10) Patent No.: US 11,463,194 B2
(45) Date of Patent: Oct. 4, 2022

(54) INFORMATION DETERMINATION METHOD, TERMINAL APPARATUS, AND NETWORK APPARATUS

(71) Applicant: GUANGDONG OPPO MOBILE TELECOMMUNICATIONS CORP., LTD., Guangdong (CN)

(72) Inventors: Zhihua Shi, Guangdong (CN); Wenhong Chen, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 0 days.

(21) Appl. No.: 16/701,681

(22) Filed: Dec. 3, 2019

(65) Prior Publication Data

US 2020/0106551 A1 Apr. 2, 2020

Related U.S. Application Data

(63) Continuation of application No. PCT/CN2018/086388, filed on May 10, 2018.

(51) Int. Cl.
*H04L 1/00* (2006.01)
*H04L 5/00* (2006.01)
*H04W 72/04* (2009.01)

(52) U.S. Cl.
CPC .......... *H04L 1/0026* (2013.01); *H04L 5/0051* (2013.01); *H04W 72/042* (2013.01); *H04W 72/0446* (2013.01)

(58) Field of Classification Search
CPC ............... H04L 1/0026; H04L 5/0051; H04W 72/0446; H04W 72/042
See application file for complete search history.

(56) References Cited

U.S. PATENT DOCUMENTS

2003/0115369 A1 6/2003 Walter et al.
2012/0155398 A1 6/2012 Oyman et al.
(Continued)

FOREIGN PATENT DOCUMENTS

CN 101141186 3/2008
CN 101355818 1/2009
(Continued)

OTHER PUBLICATIONS

3GPP TS 38.214 V15.0.0, p. 19 (Year: 2017).*
(Continued)

*Primary Examiner* — Sharmin Chowdhury
(74) *Attorney, Agent, or Firm* — Hodgson Russ LLP

(57) ABSTRACT

An information determination method includes: receiving, by a terminal device, first configuration information sent by a network device, wherein the first configuration information is used for configuring at least one CSI-RS resource group and used for indicating a first offset for the at least one CSI-RS resource group, each CSI-RS resource group comprises P number of CSI-RS resources, the at least one CSI-RS resource group is used for determining a first signal, and the first signal occupies Q number of slots, P and Q being integers greater than or equal to 2; receiving, by the terminal device, first indication information sent by the network device, wherein the first indication information is used for triggering the terminal device to receive the first signal; and receiving, by the terminal device in response to the first indication information, the first signal according to the first configuration information.

7 Claims, 4 Drawing Sheets

---

200

A TERMINAL APPARATUS RECEIVES FIRST CONFIGURATION INFORMATION SENT BY A NETWORK APPARATUS, THE FIRST CONFIGURATION INFORMATION BEING USED TO CONFIGURE AT LEAST ONE CSI-RS RESOURCE GROUP AND TO INDICATE A FIRST OFFSET FOR THE AT LEAST ONE CSI-RS RESOURCE GROUP, WHEREIN EACH CSI-RS RESOURCE GROUP COMPRISES P CSI-RS RESOURCES, THE AT LEAST ONE CSI-RS RESOURCE GROUP IS FOR DETERMINING A FIRST SIGNAL, THE FIRST SIGNAL OCCUPIES Q TIME SLOTS, AND P AND Q ARE INTEGERS GREATER THAN OR EQUAL TO 2 — S210

THE TERMINAL APPARATUS RECEIVES FIRST INSTRUCTION INFORMATION SENT BY THE NETWORK APPARATUS, THE FIRST INSTRUCTION INFORMATION TRIGGERING THE TERMINAL APPARATUS TO RECEIVE THE FIRST SIGNAL — S220

THE TERMINAL APPARATUS RECEIVES, IN RESPONSE TO THE FIRST INSTRUCTION INFORMATION, THE FIRST SIGNAL ACCORDING TO THE FIRST CONFIGURATION INFORMATION — S230

(56) References Cited

U.S. PATENT DOCUMENTS

| | | | |
|---|---|---|---|
| 2015/0245344 A1 | 8/2015 | You et al. | |
| 2017/0215157 A1 | 7/2017 | Yang et al. | |
| 2019/0052443 A1* | 2/2019 | Cheng | H04L 5/0051 |
| 2019/0165880 A1* | 5/2019 | Hakola | H04L 1/008 |
| 2020/0366351 A1* | 11/2020 | Karjalainen | H04L 5/0051 |
| 2021/0067291 A1* | 3/2021 | Gao | H04L 5/0048 |

FOREIGN PATENT DOCUMENTS

| | | |
|---|---|---|
| CN | 102883341 | 1/2013 |
| CN | 104604283 | 5/2015 |
| CN | 105680999 | 6/2016 |
| CN | 107683579 | 2/2018 |
| CN | 104641582 | 3/2018 |
| CN | 107889222 | 4/2018 |
| JP | 2021507573 | 2/2021 |
| RU | 2623736 | 6/2017 |
| RU | 2647694 | 3/2018 |
| WO | 2017146475 | 8/2017 |
| WO | 2019136640 | 7/2019 |
| WO | WO 2019191871 A1 * | 10/2019 |
| WO | WO 2019195171 A1 * | 10/2019 |

OTHER PUBLICATIONS

Fujitsu, "Ambiguities about beam indication and aperiodic CSI-RS triggering offset configuration in some cases", 3GPP TSG RAN WG1 Meeting #92 R1-1801892, February 26-Mar. 2, 2018 (Year: 2018).*

"Summary#2 for TRS", 3GPP TSG-RAN WG1 Meeting #92 R1-1803438, Mar. 2018 (Year: 2018).*

3GPP TS 38.331 V15.1.0 (Mar. 2018), 43 pages (Year: 2018).*

WIPO, ISR for PCT/CN2018/086388, Feb. 14, 2019.

Mediatek Inc., "Summary #1 for TRS," 3GPP TSG-RAN WG1 Meeting #92bis, R1-1805550, Apr. 2018, 11 pages.

RAN1,"LS for supporting aperiodic TRS," 3GPP TSG RAN WG1 Meeting #92bis, R1-1805763, Apr. 2018, 1 page.

Qualcomm Incorporated, "Discussion on DCI related issues," 3GPP TSG RAN WG1 Meeting #92, R1-1802836, Feb. 2018, 4 pages.

EPO, Extended European Search Report for EP Application No. 18918389.0, dated Jul. 1, 2020.

CNIPA, First Office Action for CN Application No. 201911316067.5, dated Nov. 3, 2020.

FSIP, Office Action for RU Application No. 2019141816/07, dated Apr. 30, 2021.

IPI, Office Action for IN Application No. 201917051032, dated May 17, 2021.

INAPI, Office Action for CL Application No. 201903722, dated Jul. 2, 2021.

CIPO, Office Action for CA Application No. 3065393, dated Mar. 1, 2021.

TIPO, Office Action for TW 108115956, dated May 5, 2022.

ILPO, Office Action for IL 270850, dated Apr. 28, 2022.

IP Indonesia, Office Action for ID P-00202000118, dated Jul. 7, 2022.

OPPO, "Remaining issues on CSI measurement," 3GPP TSG RAN WG1 Meeting #92bis, R1-1803981, Apr. 2018.

JPO, Office Action for JP Application No. 2019-567330, dated Feb. 25, 2022.

* cited by examiner

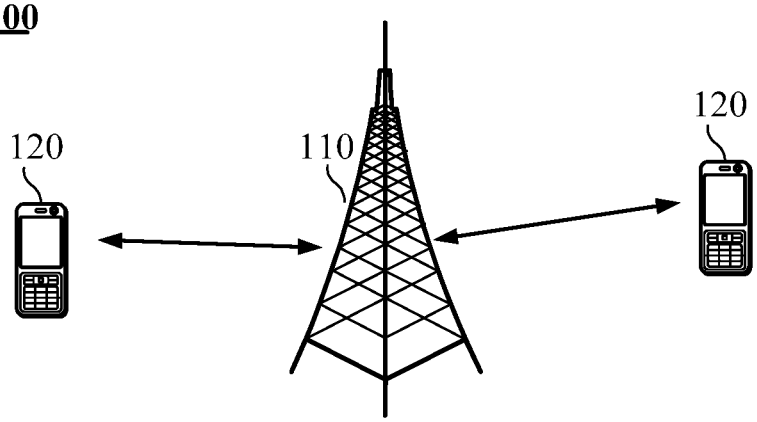

| A TERMINAL APPARATUS RECEIVES FIRST CONFIGURATION INFORMATION SENT BY A NETWORK APPARATUS, THE FIRST CONFIGURATION INFORMATION BEING USED TO CONFIGURE AT LEAST ONE CSI-RS RESOURCE GROUP AND TO INDICATE A FIRST OFFSET FOR THE AT LEAST ONE CSI-RS RESOURCE GROUP, WHEREIN EACH CSI-RS RESOURCE GROUP COMPRISES P CSI-RS RESOURCES, THE AT LEAST ONE CSI-RS RESOURCE GROUP IS FOR DETERMINING A FIRST SIGNAL, THE FIRST SIGNAL OCCUPIES Q TIME SLOTS, AND P AND Q ARE INTEGERS GREATER THAN OR EQUAL TO 2 | ~ S210 |

| THE TERMINAL APPARATUS RECEIVES FIRST INSTRUCTION INFORMATION SENT BY THE NETWORK APPARATUS, THE FIRST INSTRUCTION INFORMATION TRIGGERING THE TERMINAL APPARATUS TO RECEIVE THE FIRST SIGNAL | ~ S220 |

| THE TERMINAL APPARATUS RECEIVES, IN RESPONSE TO THE FIRST INSTRUCTION INFORMATION, THE FIRST SIGNAL ACCORDING TO THE FIRST CONFIGURATION INFORMATION | ~ S230 |

FIG. 2

INFORMATION DETERMINATION METHOD, TERMINAL APPARATUS, AND NETWORK APPARATUS

CROSS-REFERENCE TO RELATED APPLICATION

This application is a continuation of International Application No. PCT/CN2018/086388, filed May 10, 2018, the entire disclosure of which is incorporated herein by reference.

TECHNICAL FIELD

The embodiments of the present application relate to the field of communications, and more specifically, to an information determining method, a terminal device, and a network device.

BACKGROUND

In a Long Term Evolution (LTE) system, a terminal device may obtain better timing/frequency tracking or timing/frequency synchronization by using a Cell-specific Reference Signal (CRS) and/or a synchronization signal.

In the New Radio (NR) system, the terminal device may conduct tracking/synchronization of frequency and/or timing through a Tracking Reference Signal (TRS) or Channel State Information Reference Signal for tracking (CSI-RS for tracking). However, in current NR systems, tracking/synchronization of frequency and/or timing is conducted mainly by a periodic tracking signal (Periodic TRS, P-TRS) composed of a periodic set of Channel State Information Reference Signal (CSI-RS) resources, which does not involve how the aperiodic TRS (A-TRS) is configured to achieve tracking/synchronization of frequency and/or timing.

SUMMARY

The embodiment of the present application provides an information determining method, a terminal device, and a network device, which may improve tracking/synchronization performance of frequency and/or timing, and improve overall system performance.

In a first aspect, an information determining method is provided, the method including:

receiving, by a terminal device, first configuration information sent by a network device, wherein the first configuration information is used for configuring at least one Channel State Information Reference Signal CSI-RS resource group and used for indicating a first offset (aperiodic triggering offset) for the at least one CSI-RS resource group, each CSI-RS resource group includes P number of CSI-RS resources, the at least one CSI-RS resource group is used for determining a first signal, and the first signal occupies Q number of slots, P and Q being integers greater than or equal to 2;

receiving, by the terminal device, first indication information sent by the network device, wherein the first indication information is used for triggering the terminal device to receive the first signal; and in response to the first indication information, the terminal device receiving the first signal according to the first configuration information.

Optionally, the terminal device uses the first signal for tracking/synchronization of frequency and/or timing.

It should be noted that, with respect to a first offset for the at least one CSI-RS resource group, it may be that each CSI-RS resource group has a corresponding first offset thereof. For example, the at least one CSI-RS resource group includes a CSI-RS resource group 1 and a CSI-RS resource group 2, the CSI-RS resource group 1 corresponds to a first offset a, and the CSI-RS resource group 2 corresponds to a first offset b.

Therefore, in the embodiment of the present application, the terminal device may receive the first signal according to the first configuration information, so that the tracking/synchronization of frequency and/or timing may be performed by using the first signal, which improves tracking/synchronization performance of frequency and/or timing, and improve overall system performance.

In some possible implementation, the first configuration information is further used for configuring a first indication parameter corresponding to the at least one CSI-RS resource group, the first indication parameter is used for indicating use of the at least one CSI-RS resource group.

In some possible implementation, the first indication parameter is a parameter trs-Info.

In some possible implementation, the at least one CSI-RS resource group includes a first CSI-RS resource group, $P=Q=2$, the terminal device receiving the first signal according to the first configuration information includes:

when the terminal device receiving the first indication information, determining a slot n according to the first offset, n being an integer greater than or equal to 0;

the terminal device determining a first slot and a second slot according to the slot n, and receiving the first signal in the first CSI-RS resource group on the first slot and the second slot.

In some possible implementation, the first slot is the slot n, and the second slot is a slot n+1; or the first slot is a slot n−1, and the second slot is the slot n; or the first slot is the slot n, the second slot is a slot m, and the slot m is a first valid downlink slot after the slot n capable of transmitting the first signal.

In some possible implementation, the first configuration information is further used for indicating a second offset for the at least one CSI-RS resource group, the at least one CSI-RS resource group includes a first CSI-RS resource group, $P=Q=2$, the terminal device receiving the first signal according to the first configuration information includes:

when the terminal device receiving the first indication information, determining a slot n and a slot m according to the first offset and the second offset, n and m being integers greater than or equal to 0;

the terminal device receiving the first signal in the first CSI-RS resource group on the slot n and the slot m.

In some possible implementation, the when the terminal device receiving the first indication information, determining a slot n and a slot m according to the first offset and the second offset includes:

when the terminal device receiving the first indication information, determining the slot n according to the first offset and determining the slot m according to the second offset; or when the terminal device receiving the first indication information, determining the slot n according to the first offset and determining the slot m according to the first offset and the second offset.

In some possible implementation, the slot n and the slot m are two consecutive slots; or the slot m is a first valid downlink slot after the slot n capable of transmitting the first signal.

In some possible implementation, the at least one CSI-RS resource group includes a first CSI-RS resource group, P=4, Q=2, the terminal device receiving the first signal according to the first configuration information includes:

when the terminal device receiving the first indication information, determining a slot n according to the first offset, n being an integer greater than or equal to 0;

the terminal device determining a first slot and a second slot according to the slot n, and receiving the first signal in the first CSI-RS resource group on the first slot and the second slot.

In some possible implementation, the first CSI-RS resource group includes a first CSI-RS resource, a second CSI-RS resource, a third CSI-RS resource, and a fourth CSI-RS resources, the terminal device receiving the first signal in the first CSI-RS resource group on the first slot and the second slot includes:

determining, by the terminal device, that the first signals in the first CSI-RS resource and the second CSI-RS resource are received on the first slot and the first signals in the third CSI-RS resource and the fourth CSI-RS resource are received on the second slot, according to a position sequence of the four CSI-RS resources in configuration information of the first CSI-RS resource group, wherein the position sequence of the four CSI-RS resources in configuration information of the first CSI-RS resource group is the first CSI-RS resource> the third CSI-RS resource, the first CSI-RS resource> the fourth CSI-RS resource, the second CSI-RS resource> the third CSI-RS resource, the second CSI-RS resource> the fourth CSI-RS resource, or the position sequence of the four CSI-RS resources in configuration information of the first CSI-RS resource group is the third CSI-RS resource> the first CSI-RS resource, the third CSI-RS resource> a second CSI-RS resource, the fourth CSI-RS resource> the first CSI-RS resource, the fourth CSI-RS resource> the second CSI-RS resource; or determining, by the terminal device, that the first signals in the first CSI-RS resource and the second CSI-RS resource are received on the first slot and the first signals in the third CSI-RS resource and the fourth CSI-RS resource are received on the second slot, according to identifiers IDs of four CSI-RS resources in the first CSI-RS resource group, wherein an order of IDs of the four CSI-RS resources in the first CSI-RS resource group is the first CSI-RS resource> the third CSI-RS resource, the first CSI-RS resource> the fourth CSI-RS a resource, the second CSI-RS resource> the third CSI-RS resource, the second CSI-RS resource> the fourth CSI-RS resource, or an order of IDs of the four CSI-RS resources in the first CSI-RS resource group is the third CSI-RS resource> the first CSI-RS resource, the third CSI-RS resource> the second CSI-RS resource, the four CSI-RS resources> the first CSI-RS resource, the fourth CSI-RS resource> the second CSI-RS resource; or the terminal device receiving the first signals in the first CSI-RS resource and the second CSI-RS resource on the first slot and receiving the first signals in the third CSI-RS resource and the fourth CSI-RS resource on the second slot, wherein the first CSI-RS resource and the third CSI-RS resource belong to one resource set, and the second CSI-RS resource and the fourth CSI-RS resource belong to one resource set, the first CSI-RS resource and the third CSI-RS resource at least have identical time domain and/or frequency domain resource configuration, and the second CSI-RS resource and the fourth CSI-RS resource at least have identical time domain and/or frequency domain resource configuration.

In some possible implementation, the first slot is the slot n, and the second slot is a slot n+1; or the first slot is a slot n−1, and the second slot is the slot n; or the first slot is the slot n, the second slot is a slot m, and the slot m is a first valid downlink slot after the slot n capable of transmitting the first signal.

In some possible implementation, the first configuration information is further used for indicating a second offset for the at least one CSI-RS resource group, the at least one CSI-RS resource group includes a first CSI-RS resource group, P=4, Q=2, the terminal device receiving the first signal according to the first configuration information includes:

when the terminal device receiving the first indication information, determining a slot n and a slot m according to the first offset and the second offset, n and m being integers greater than or equal to 0;

the terminal device receiving the first signal in the first CSI-RS resource group on the slot n and the slot m.

In some possible implementation, the first CSI-RS resource group includes a first CSI-RS resource, a second CSI-RS resource, a third CSI-RS resource, and a fourth CSI-RS resources, the terminal device receiving the first signal in the first CSI-RS resource group on the slot n and the slot m includes:

determining, by the terminal device, that the first signals in the first CSI-RS resource and the second CSI-RS resource are received on the slot n and the first signals in the third CSI-RS resource and the fourth CSI-RS resource are received on the slot m, according to a position sequence of the four CSI-RS resources in configuration information of the first CSI-RS resource group, wherein the position sequence of the four CSI-RS resources in configuration information of the first CSI-RS resource group is the first CSI-RS resource> the third CSI-RS resource, the first CSI-RS resource> the fourth CSI-RS resource, the second CSI-RS resource> the third CSI-RS resource, the second CSI-RS resource> the fourth CSI-RS resource, or the position sequence of the four CSI-RS resources in configuration information of the first CSI-RS resource group is the third CSI-RS resource> the first CSI-RS resource, the third CSI-RS resource> a second CSI-RS resource, the fourth CSI-RS resource> the first CSI-RS resource, the fourth CSI-RS resource> the second CSI-RS resource; or determining, by the terminal device, that the first signals in the first CSI-RS resource and the second CSI-RS resource are received on the slot n and the first signals in the third CSI-RS resource and the fourth CSI-RS resource are received on the slot m, according to identifiers IDs of four CSI-RS resources in the first CSI-RS resource group, wherein an order of IDs of the four CSI-RS resources in the first CSI-RS resource group is the first CSI-RS resource> the third CSI-RS resource, the first CSI-RS resource> the fourth CSI-RS a resource, the second CSI-RS resource> the third CSI-RS resource, the second CSI-RS resource> the fourth CSI-RS resource, or an order of IDs of the four CSI-RS resources in the first CSI-RS resource group is the third CSI-RS resource> the first CSI-RS resource, the third CSI-RS resource> the second CSI-RS resource, the four CSI-RS resources> the first CSI-RS resource, the fourth CSI-RS resource> the second CSI-RS resource; or the terminal device receiving the first signals in the first CSI-RS resource and the second CSI-RS resource on the slot n and receiving the first signals in the third CSI-RS resource and the fourth CSI-RS resource on the slot m, wherein the first CSI-RS resource and the third CSI-RS resource belong to one resource set, and the second CSI-RS resource and the fourth CSI-RS resource belong to one resource set, the first CSI-RS resource and the third CSI-RS resource at least have identical time domain and/or frequency domain resource configuration, and the second CSI-RS resource and the fourth CSI-RS resource at least have identical time domain and/or frequency domain resource configuration.

In some possible implementation, the when the terminal device receiving the first indication information, determining a slot n and a slot m according to the first offset and the second offset includes:

when the terminal device receiving the first indication information, determining the slot n according to the first offset and determining the slot m according to the second offset; or when the terminal device receiving the first indication information, determining the slot n according to the first offset and determining the slot m according to the first offset and the second offset.

In some possible implementation, the slot n and the slot m are two consecutive slots; or the slot m is a first valid downlink slot after the slot n capable of transmitting the first signal.

In some possible implementation, the at least one CSI-RS resource group includes a first CSI-RS resource group, and the first configuration information is further used for indicating a third offset for each CSI-RS resource in the first CSI-RS resource group, P=4, Q=2, the terminal device receiving the first signal according to the first configuration information includes:

when the terminal device receiving the first indication information, determining the slot n according to the first offset and a third offset for a first CSI-RS resource, or, when the terminal device receiving the first indication information, determining the slot n according to the third offset for a first CSI-RS resource, wherein the first CSI-RS resource is any one CSI-RS resource in four CSI-RS resources of the first CSI-RS resource group, n being an integer greater than or equal to 0;

the terminal device receiving the first signal in the first CSI-RS resource on the slot n.

In some possible implementation, the third offset is specifically configured in the first CSI-RS resource group, or specifically configured in its corresponding CSI-RS resource.

In some possible implementation, if the third offset is specifically configured in the first CSI-RS resource group, a part or all of the CSI-RS resources in the first CSI-RS resource group is configured with the third offset.

In some possible implementation, if the first CSI-RS resource group includes at least one CSI-RS resource not configured with the third offset, the first configuration information indicates that the third offset corresponding to each CSI-RS resource of the at least one CSI-RS resource not configured with the third offset is a pre-configured value.

In some possible implementation, if the third offset is specifically configured in its corresponding CSI-RS resource, the first CSI-RS resource group includes a second CSI-RS resource, if the second CSI-RS resource is not configured with the third offset, the first configuration information indicates that the third offset corresponding to the second CSI-RS resource is a pre-configured value.

In some possible implementation, the pre-configured value is zero.

In some possible implementation, if the third offset is specifically configured in its corresponding CSI-RS resource, the third offset corresponding to the first CSI-RS resource is determined according to an offset obtained by interpreting indication corresponding to a field based on periodic signal configuration.

In some possible implementation, the at least one CSI-RS resource group includes a first CSI-RS resource group and a second CSI-RS resource group, P=Q=2, the terminal device receiving the first signal according to the first configuration information includes:

when the terminal device receiving the first indication information, determining the slot n according to the first offset corresponding to the first CSI-RS resource group, and determining the slot m according to the first offset corresponding to the second CSI-RS resource group, n and m being integers greater than or equal to 0;

the terminal device receiving the first signal in the first CSI-RS resource group on the slot n, and receiving the first signal in the second CSI-RS resource group on the slot m.

In some possible implementation, the first offset corresponding to the first CSI-RS resource group and the first offset corresponding to the second CSI-RS resource group differ by K slots, K being an integer greater than or equal to 1.

In some possible implementation, K=1.

In some possible implementation, the first signal is an aperiodic CSI-RS for Tracking.

In some possible implementation, the first configuration information is radio resource control RRC signaling, and the first indication information is downlink control information DCI signaling.

In a second aspect, an information determining method is provided, the method including:

a network device sending first configuration information to a terminal device, wherein the first configuration information is used for configuring at least one Channel State Information Reference Signal CSI-RS resource group and used for indicating a first offset for the at least one CSI-RS resource group, each CSI-RS resource group includes P number of CSI-RS resources, the at least one CSI-RS resource group is used for determining a first signal, and the first signal occupies Q number of slots, P and Q being integers greater than or equal to 2;

the network device sending first indication information to the terminal device, wherein the first indication information is used for triggering the terminal device to receive the first signal; and the network device sending the first signal to the terminal device according to the first configuration information.

Optionally, the terminal device uses the first signal for tracking/synchronization of frequency and/or timing.

Therefore, in the embodiment of the present application, the network device sends the first configuration information to the terminal device, sends the first indication information for triggering the terminal device to receive the first signal to the terminal device, and sends the first signal according to the first configuration information, so that the terminal device may receive the first signal according to the first configuration information, thus the tracking/synchronization of frequency and/or timing may be performed by using the first signal, which improves tracking/synchronization performance of frequency and/or timing, and improve overall system performance.

In some possible implementation, the first configuration information is further used for configuring a first indication parameter corresponding to the at least one CSI-RS resource group, the first indication parameter is used for indicating use of the at least one CSI-RS resource group.

In some possible implementation, the first indication parameter is a parameter trs-Info.

In some possible implementation, the at least one CSI-RS resource group includes a first CSI-RS resource group, P=Q=2, the network device sending the first signal to the terminal device according to the first configuration information includes:

when the network device sending the first indication information, determining a slot n according to the first offset, n being an integer greater than or equal to 0;

the network device determining a first slot and a second slot according to the slot n, and sending the first signal in the first CSI-RS resource group to the terminal device on the first slot and the second slot.

In some possible implementation, the first slot is the slot n, and the second slot is a slot n+1; or the first slot is a slot n−1, and the second slot is the slot n; or the first slot is the slot n, the second slot is a slot m, and the slot m is a first valid downlink slot after the slot n capable of transmitting the first signal.

In some possible implementation, the first configuration information is further used for indicating a second offset for the at least one CSI-RS resource group, the at least one CSI-RS resource group includes a first CSI-RS resource group, P=Q=2, the network device sending the first signal to the terminal device according to the first configuration information includes:

when the network device sending the first indication information, determining a slot n and a slot m according to the first offset and the second offset, n and m being integers greater than or equal to 0;

the network device sending the first signal in the first CSI-RS resource group to the terminal device on the slot n and the slot m.

In some possible implementation, the when the network device sending the first indication information, determining a slot n and a slot m according to the first offset and the second offset includes:

when the network device sending the first indication information, determining the slot n according to the first offset and determining the slot m according to the second offset; or when the network device sending the first indication information, determining the slot n according to the first offset and determining the slot m according to the first offset and the second offset.

In some possible implementation, the slot n and the slot m are two consecutive slots; or the slot m is a first valid downlink slot after the slot n capable of transmitting the first signal.

In some possible implementation, the at least one CSI-RS resource group includes a first CSI-RS resource group, P=4, Q=2, the network device sending the first signal to the terminal device according to the first configuration information includes:

when the network device sending the first indication information, determining a slot n according to the first offset, n being an integer greater than or equal to 0;

the network device determining a first slot and a second slot according to the slot n, and sending the first signal in the first CSI-RS resource group to the terminal device on the first slot and the second slot.

In some possible implementation, the first CSI-RS resource group includes a first CSI-RS resource, a second CSI-RS resource, a third CSI-RS resource, and a fourth CSI-RS resources, the network device sending the first signal in the first CSI-RS resource group to the terminal device on the first slot and the second slot includes:

determining, by the network device, that the first signals in the first CSI-RS resource and the second CSI-RS resource are sent on the first slot and the first signals in the third CSI-RS resource and the fourth CSI-RS resource are sent on the second slot, according to a position sequence of the four CSI-RS resources in configuration information of the first CSI-RS resource group, wherein the position sequence of the four CSI-RS resources in configuration information of the first CSI-RS resource group is the first CSI-RS resource> the third CSI-RS resource, the first CSI-RS resource> the fourth CSI-RS resource, the second CSI-RS resource> the third CSI-RS resource, the second CSI-RS resource> the fourth CSI-RS resource, or the position sequence of the four CSI-RS resources in configuration information of the first CSI-RS resource group is the third CSI-RS resource> the first CSI-RS resource, the third CSI-RS resource> a second CSI-RS resource, the fourth CSI-RS resource> the first CSI-RS resource, the fourth CSI-RS resource> the second CSI-RS resource; or determining, by the network device, that the first signals in the first CSI-RS resource and the second CSI-RS resource are sent on the first slot and the first signals in the third CSI-RS resource and the fourth CSI-RS resource are sent on the second slot, according to identifiers IDs of four CSI-RS resources in the first CSI-RS resource group, wherein an order of IDs of the four CSI-RS resources in the first CSI-RS resource group is the first CSI-RS resource> the third CSI-RS resource, the first CSI-RS resource> the fourth CSI-RS a resource, the second CSI-RS resource> the third CSI-RS resource, the second CSI-RS resource> the fourth CSI-RS resource, or an order of IDs of the four CSI-RS resources in the first CSI-RS resource group is the third CSI-RS resource> the first CSI-RS resource, the third CSI-RS resource> the second CSI-RS resource, the four CSI-RS resources> the first CSI-RS resource, the fourth CSI-RS resource> the second CSI-RS resource; or the network device sending the first signals in the first CSI-RS resource and the second CSI-RS resource on the first slot and sending the first signals in the third CSI-RS resource and the fourth CSI-RS resource on the second slot, wherein the first CSI-RS resource and the third CSI-RS resource belong to one resource set, and the second CSI-RS resource and the fourth CSI-RS resource belong to one resource set, the first CSI-RS resource and the third CSI-RS resource at least have identical time domain and/or frequency domain resource configuration, and the second CSI-RS resource and the fourth CSI-RS resource at least have identical time domain and/or frequency domain resource configuration.

In some possible implementation, the first slot is the slot n, and the second slot is a slot n+1; or the first slot is a slot n−1, and the second slot is the slot n; or the first slot is the slot n, the second slot is a slot m, and the slot m is a first valid downlink slot after the slot n capable of transmitting the first signal.

In some possible implementation, the first configuration information is further used for indicating a second offset for the at least one CSI-RS resource group, the at least one CSI-RS resource group includes a first CSI-RS resource group, P=4, Q=2, the network device sending the first signal to the terminal device according to the first configuration information includes:

when the network device sending the first indication information, determining a slot n and a slot m according to the first offset and the second offset, n and m being integers greater than or equal to 0;

the network device sending the first signal in the first CSI-RS resource group to the terminal device on the slot n and the slot m.

In some possible implementation, the first CSI-RS resource group includes a first CSI-RS resource, a second CSI-RS resource, a third CSI-RS resource, and a fourth CSI-RS resources, the network device sending the first signal in the first CSI-RS resource group to the terminal device on the slot n and the slot m includes:

determining, by the network device, that the first signals in the first CSI-RS resource and the second CSI-RS resource are sent on the slot n and the first signals in the third CSI-RS resource and the fourth CSI-RS resource are sent on the slot m, according to a position sequence of the four CSI-RS resources in configuration information of the first CSI-RS resource group, wherein the position sequence of the four CSI-RS resources in configuration information of the first CSI-RS resource group is the first CSI-RS resource> the third CSI-RS resource, the first CSI-RS resource> the fourth CSI-RS resource, the second CSI-RS resource> the third CSI-RS resource, the second CSI-RS resource> the fourth CSI-RS resource, or the position sequence of the four CSI-RS resources in configuration information of the first CSI-RS resource group is the third CSI-RS resource> the first CSI-RS resource, the third CSI-RS resource> a second CSI-RS resource, the fourth CSI-RS resource> the first CSI-RS resource, the fourth CSI-RS resource> the second CSI-RS resource; or determining, by the network device, that the first signals in the first CSI-RS resource and the second CSI-RS resource are sent on the slot n and the first signals in the third CSI-RS resource and the fourth CSI-RS resource are sent on the slot m, according to identifiers IDs of four CSI-RS resources in the first CSI-RS resource group, wherein an order of IDs of the four CSI-RS resources in the first CSI-RS resource group is the first CSI-RS resource> the third CSI-RS resource, the first CSI-RS resource> the fourth CSI-RS a resource, the second CSI-RS resource> the third CSI-RS resource, the second CSI-RS resource> the fourth CSI-RS resource, or an order of IDs of the four CSI-RS resources in the first CSI-RS resource group is the third CSI-RS resource> the first CSI-RS resource, the third CSI-RS resource> the second CSI-RS resource, the four CSI-RS resources> the first CSI-RS resource, the fourth CSI-RS resource> the second CSI-RS resource; or the network device sending the first signals in the first CSI-RS resource and the second CSI-RS resource on the slot n and sending the first signals in the third CSI-RS resource and the fourth CSI-RS resource on the slot m, wherein the first CSI-RS resource and the third CSI-RS resource belong to one resource set, and the second CSI-RS resource and the fourth CSI-RS resource belong to one resource set, the first CSI-RS resource and the third CSI-RS resource at least have identical time domain and/or frequency domain resource configuration, and the second CSI-RS resource and the fourth CSI-RS resource at least have identical time domain and/or frequency domain resource configuration.

In some possible implementation, the when the network device sending the first indication information, determining a slot n and a slot m according to the first offset and the second offset includes:

when the network device sending the first indication information, determining the slot n according to the first offset and determining the slot m according to the second offset; or when the network device sending the first indication information, determining the slot n according to the first offset and determining the slot m according to the first offset and the second offset.

In some possible implementation, the slot n and the slot m are two consecutive slots; or the slot m is a first valid downlink slot after the slot n capable of transmitting the first signal.

In some possible implementation, the at least one CSI-RS resource group includes a first CSI-RS resource group, and the first configuration information is further used for indicating a third offset for each CSI-RS resource in the first CSI-RS resource group, P=4, Q=2, the network device sending the first signal to the terminal device according to the first configuration information includes:

when the network device sending the first indication information, determining the slot n according to the first offset and a third offset for a first CSI-RS resource, or, when the network device sending the first indication information, determining the slot n according to the third offset for a first CSI-RS resource, wherein the first CSI-RS resource is any one CSI-RS resource in four CSI-RS resources of the first CSI-RS resource group, n being an integer greater than or equal to 0;

the network device sending the first signal in the first CSI-RS resource to the terminal device on the slot n.

In some possible implementation, the third offset is specifically configured in the first CSI-RS resource group, or specifically configured in its corresponding CSI-RS resource.

In some possible implementation, if the third offset is specifically configured in the first CSI-RS resource group, a part or all of the CSI-RS resources in the first CSI-RS resource group is configured with the third offset.

In some possible implementation, if the first CSI-RS resource group includes at least one CSI-RS resource not configured with the third offset, the first configuration information indicates that the third offset corresponding to each CSI-RS resource of the at least one CSI-RS resource not configured with the third offset is a pre-configured value.

In some possible implementation, if the third offset is specifically configured in its corresponding CSI-RS resource, the first CSI-RS resource group includes a second CSI-RS resource, if the second CSI-RS resource is not configured with the third offset, the first configuration information indicates that the third offset corresponding to the second CSI-RS resource is a pre-configured value.

In some possible implementation, the pre-configured value is zero.

In some possible implementation, if the third offset is specifically configured in its corresponding CSI-RS resource, the third offset corresponding to the first CSI-RS resource is determined according to an offset obtained by interpreting indication corresponding to a field based on periodic signal configuration.

In some possible implementation, the at least one CSI-RS resource group includes a first CSI-RS resource group and a second CSI-RS resource group, P=Q=2, the network device sending the first signal to the terminal device according to the first configuration information includes:

when the network device sending the first indication information, determining the slot n according to the first offset corresponding to the first CSI-RS resource group, and determining the slot m according to the first offset corresponding to the second CSI-RS resource group, n and m being integers greater than or equal to 0;

the network device sending the first signal in the first CSI-RS resource group to the terminal device on the slot n, and sending the first signal in the second CSI-RS resource group to the terminal device on the slot m.

In some possible implementation, the first offset corresponding to the first CSI-RS resource group and the first offset corresponding to the second CSI-RS resource group differ by K slots, K being an integer greater than or equal to 1.

In some possible implementation, K=1.

In some possible implementation, the first signal is an aperiodic CSI-RS for Tracking.

In some possible implementation, the first configuration information is radio resource control RRC signaling, and the first indication information is downlink control information DCI signaling.

In a third aspect, a terminal device is provided for performing methods in the above first aspect or each implementation thereof.

Specifically, the terminal device includes functional modules for performing the method in the above first aspect or each implementation thereof.

In a fourth aspect, a network device is provided for performing the method in the above second aspect or each implementation thereof.

Specifically, the network device includes functional modules for performing the method in the above second aspect or each implementation thereof.

In a fifth aspect, a terminal device is provided, including a processor and a memory. The memory is for storing a computer program for invoking and running a computer program stored in the memory, performing the method in the above first aspect or each implementation thereof.

In a sixth aspect, a network device is provided, including a processor and a memory. The memory is for storing a computer program for invoking and running a computer program stored in the memory, performing the method in the above second aspect or each implementation thereof.

In a seventh aspect, a chip is provided for implementing the method of any one of the first to second aspects above or the implementations thereof.

Specifically, the chip includes: a processor for invoking and running a computer program from the memory, such that the device on which the chip is mounted performs the method in any one of the first aspect to the second aspect or the implementation thereof.

In an eighth aspect, a computer readable storage medium is provided for storing a computer program, the computer program causing a computer to perform the method of any one of the first aspect to the second aspect or the implementation thereof.

In a ninth aspect, a computer program product is provided, including computer program instructions, the computer program instructions causing a computer to perform the method of any one of the first aspect to the second aspect or the implementations thereof.

In a tenth aspect, a computer program is provided, which, when run on a computer, causes the computer to perform the method of any of the first to second aspects or the implementations thereof.

In an eleventh aspect, a system for wireless communication is provided, including a terminal device and a network device, wherein the terminal device is configured to: receive first configuration information sent by the network device, wherein the first configuration information is used for configuring at least one Channel State Information Reference Signal CSI-RS resource group and used for indicating a first offset for the at least one CSI-RS resource group, each CSI-RS resource group includes P number of CSI-RS resources, the at least one CSI-RS resource group is used for determining a first signal, and the first signal occupies Q number of slots, P and Q being integers greater than or equal to 2; receive first indication information sent by the network device, wherein the first indication information is used for triggering the terminal device to receive the first signal; receive the first signal according to the first configuration information in response to the first indication information;

the network device is configured to: send first configuration information to the terminal device, wherein the first configuration information is used for configuring at least one Channel State Information Reference Signal CSI-RS resource group and used for indicating a first offset for the at least one CSI-RS resource group, each CSI-RS resource group includes P number of CSI-RS resources, the at least one CSI-RS resource group is used for determining a first signal, and the first signal occupies Q number of slots, P and Q being integers greater than or equal to 2; send first indication information to the terminal device, wherein the first indication information is used for triggering the terminal device to receive the first signal; send the first signal to the terminal device according to the first configuration information.

Specifically, the terminal device is configured to perform the method in the foregoing first aspect or each implementation thereof, and the network device is configured to perform the method in the foregoing second aspect or each implementation thereof.

BRIEF DESCRIPTION OF THE DRAWINGS

FIG. 1 is a schematic diagram of an application scenario of an embodiment of the present application.

FIG. 2 is a schematic flowchart of an information determining method according to an embodiment of the present application.

DETAILED DESCRIPTION

Figure 3:
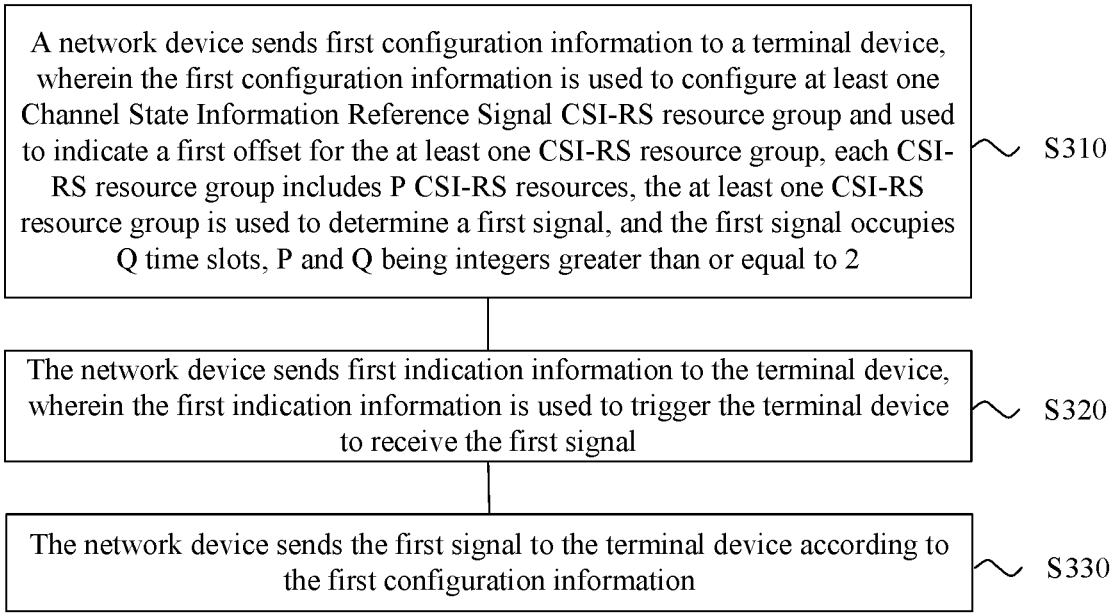
FIG. 3 is a schematic flowchart of an information determining method according to another embodiment of the present application.

The technical solutions in the present application will be described below in conjunction with the drawings in the embodiments of the present application.

The embodiments of the present application may be applied to various communication systems, such as a Global System of Mobile communication (GSM) system, a Code Division Multiple Access (CDMA) system, a Wideband Code Division Multiple Access (WCDMA) system, General Packet Radio Service (GPRS), a Long Term Evolution (LTE) system, an Advanced Long Term Evolution (LTE-A) system, a New Radio (NR) system, an evolution system of the NR system, a LTE-based access to unlicensed spectrum (LTE-U) system, a NR-based access to unlicensed spectrum (NR-U) system, a Universal Mobile Telecommunication System (UMTS), a Wireless Local Area Network (WLAN), Wireless Fidelity (WiFi), a next-generation communication system, or other communication systems or the like.

In general, traditional communication systems support a limited number of connection and are easy to implement. However, with development of communication technologies, mobile communication systems will not only support traditional communication, but also support, for example, Device to Device (D2D) communication, Machine to Machine (M2M) communication, Machine Type Communication (MTC), and Vehicle to Vehicle (V2V) communication, etc., and embodiments of the present application may also be applied to these communication systems.

Optionally, the communication system in the embodiment of the present application may be applied to a Carrier Aggregation (CA) scenario, or may be applied to a Dual Connectivity (DC) scenario, and may also be applied to a Standalone (SA) Net scenario.

The embodiment of the present application does not limit the applied spectrum. For example, the embodiment of the present application may be applied to an authorized spectrum, and may also be applied to an unlicensed spectrum.

The embodiments of the present application describe various embodiments in combination with a network device and a terminal device, where the terminal device may also be referred to as User Equipment (UE), an access terminal, a subscriber unit, a subscriber station, a mobile station, a mobile platform, and a remote station, a remote terminal, a mobile device, a user terminal, a terminal, a wireless communication device, a user agent or a user device or the like. The terminal device may be a STAION (ST) in the WLAN, which may be a cellular phone, a cordless phone, a Session Initiation Protocol (SIP) phone, a Wireless Local Loop (WLL) station, and a Personal Digital Assistant (PDA) device, a handheld device with wireless communication capabilities, a computing device or other processing devices connected to a wireless modem, an in-vehicle device, a wearable device, and a next-generation communication system, such as a terminal device in a NR network or terminal equipment in the future evolution of the Public Land Mobile Network (PLMN) network.

By way of example and not limitation, in the embodiment of the present application, the terminal device may also be a wearable device. A wearable device, which may also be called a wearable smart device, is a general term for applying wearable technology to intelligently design daily wear and developing wearable devices, such as glasses, gloves, watches, clothing, and shoes or the like. A wearable device is a portable device that is worn directly on the body or integrated into clothing or accessories of the user. Wearable devices are more than just hardware devices, they may also implement powerful functions through software support, data interaction, and cloud interaction. Generalized wearable smart devices include for example, full-featured, large-size smart watches or smart glasses or the like which may does not rely on smartphones for full or partial functions, and include for example, various smart bracelets for smart signs monitoring, smart jewelry or the like that focus on only one type of application function and need to work with other devices such as smartphones.

The network device may be a device for communicating with the mobile device, and the network device may be an Access Point (AP) in the WLAN, a Base Transceiver Station (BTS) in GSM or CDMA, or may be a base station (NodeB, NB) in WCDMA, or may also be an Evolutional Node B (eNB or eNodeB) in LTE, or a relay station or an access point, or an in-vehicle device, a wearable device, and a network device (gNB) in the NR network, or a network device in a future evolved PLMN network or the like.

In the embodiment of the present application, the network device provides service for a cell, and the terminal device communicates with the network device by using a transmission resource (for example, a frequency domain resource, or a spectrum resource) used by the cell. The cell may be a cell corresponding to a network device (for example, a base station), the cell may belong to a macro base station, or may belong to a base station corresponding to a Small cell. The Small cell herein may include: a Metro cell, a Micro cell, a Pico cell, a Femto cell, etc. These Small cells have characteristics of small coverage and low transmission power, and are suitable for providing high-speed data transmission services.

FIG. 1 exemplarily shows one network device and two terminal devices. Optionally, the wireless communication system 100 may include a plurality of network devices and may include other numbers of terminal devices within the coverage of each network device. The embodiments of the present application do not limit this.

Optionally, the wireless communication system 100 may further include other network entities, such as a Mobility Management Entity (MME), an Access and Mobility Management Function (AMF), and the like. The embodiments of the present application do not limit this.

It should be understood that the terms "system" and "network" are used interchangeably herein. The term "and/or" in this context is merely an association describing associated objects, indicating that there may be three relationships, for example, A and/or B may indicate that A exists separately, both A and B simultaneously exist, B exists separately. In addition, the character "/" in this application generally indicates that contextual objects are in an "or" relationship.

FIG. 2 is a schematic flowchart of an information determining method 200 according to an embodiment of the present application. The method 200 is optionally applicable to the system shown in FIG. 1, but is not limited thereto. The method 200 includes at least some of the following.

In step S210, the terminal device receives first configuration information sent by a network device, wherein the first configuration information is used for configuring at least one Channel State Information Reference Signal CSI-RS resource group and used for indicating a first offset for the at least one CSI-RS resource group, each CSI-RS resource group includes P number of CSI-RS resources, the at least one CSI-RS resource group is used for determining a first signal, and the first signal occupies Q number of slots, P and Q being integers greater than or equal to 2.

Optionally, the first configuration information is RRC signaling.

It should be noted that, with respect to a first offset for the at least one CSI-RS resource group, it may be that each CSI-RS resource group has a corresponding first offset thereof. For example, the at least one CSI-RS resource group includes a CSI-RS resource group 1 and a CSI-RS resource group 2, the CSI-RS resource group 1 corresponds to a first offset a, and the CSI-RS resource group 2 corresponds to a first offset b.

Optionally, the terminal device uses the first signal for tracking/synchronization of frequency and/or timing.

Optionally, the first configuration information is further used for configuring a first indication parameter corresponding to the at least one CSI-RS resource group, the first indication parameter is used for indicating use of the at least one CSI-RS resource group.

For example, the first indication parameter is a parameter trs-Info.

Optionally, the first signal is an aperiodic CSI-RS for Tracking. This first signal may also be referred to as an aperiodic TRS (A-TRS).

In step S220, the terminal device receives first indication information sent by the network device, wherein the first indication information is used for triggering the terminal device to receive the first signal.

Optionally, the first indication information is DCI signaling.

In step S230, in response to the first indication information, the terminal device receives the first signal according to the first configuration information.

The information determining method 200 in the embodiment of the present application is described below with reference to specific embodiments.

Embodiment 1

The at least one CSI-RS resource group includes a first CSI-RS resource group, P=Q=2. In other words, the first CSI-RS resource group includes 2 CSI-RS resources, and the first signal occupies 2 Timeslot (burst length X=2).

It should be understood that the first offset indicated by the first configuration information is an offset for the first CSI-RS resource group.

Specifically, in this embodiment 1, when the terminal device receives the first indication information, a slot n is determined according to the first offset, n being an integer greater than or equal to 0;

the terminal device determines a first slot and a second slot according to the slot n, and receives the first signal in the first CSI-RS resource group on the first slot and the second slot.

In other words, the first signal in the first CSI-RS resource group is sent once both on the first slot and on the second slot.

For example, if the terminal device receives the first indication information on the slot 1 and the first offset is 3, it may be determined that n=4. In other words, when the terminal device receives the first indication information, a slot 4 is determined according to the first offset.

Optionally, in this embodiment 1, the first slot is the slot n, and the second slot is a slot n+1; or the first slot is a slot n−1, and the second slot is the slot n; or the first slot is the slot n, the second slot is a slot m, and the slot m is a first valid downlink slot after the slot n capable of transmitting the first signal (for example, in a LTE Time Division Duplex (TDD) system, an uplink slot may exist between two consecutive downlink slots.

Embodiment 2

The first configuration information is further used for indicating a second offset for the at least one CSI-RS resource group, the at least one CSI-RS resource group includes a first CSI-RS resource group, P=Q=2. In other words, the first CSI-RS resource group includes two CSI-RS resources, and the first signal occupies two slots.

It should be understood that the first offset and the second offset indicated by the first configuration information are offsets for the first CSI-RS resource group.

Specifically, in this embodiment 2, when the terminal device receives the first indication information, a slot n and a slot m are determined according to the first offset and the second offset, n and m being integers greater than or equal to 0;

the terminal device receives the first signal in the first CSI-RS resource group on the slot n and the slot m.

In other words, the first signal in the first CSI-RS resource group is sent once both on the first slot and on the second slot.

Optionally, in this embodiment 2, when the terminal device receives the first indication information, the slot n is determined according to the first offset and the slot m is determined according to the second offset; or when the terminal device receives the first indication information, the slot n is determined according to the first offset and the slot m is determined according to the first offset and the second offset.

For example, the terminal device receives the first indication information on the slot 1, the first offset is 3, and the second offset is 4, then it may be determined that n=4, and m=5. In other words, when receiving the first indication information, the terminal device determines the slot 4 according to the first offset, and determines the slot 5 according to the second offset.

For another example, the terminal device receives the first indication information on the slot 1, the first offset is 3, and the second offset is 1, then it may be determined that n=4, and m=5. In other words, when receiving the first indication information, the terminal device determines the slot 4 according to the first offset, and determines the slot 5 according to the first offset and the second offset.

Optionally, in this embodiment 2, the slot n and the slot m are two consecutive slots; or the slot m is a first valid downlink slot after the slot n capable of transmitting the first signal.

Embodiment 3

The at least one CSI-RS resource group includes a first CSI-RS resource group, P=4, Q=2. In other words, the first CSI-RS resource group includes four CSI-RS resources, and the first signal occupies 2 slots.

It should be understood that the first offset indicated by the first configuration information is an offset for the first CSI-RS resource group.

Specifically, in this embodiment 3, when the terminal device receives the first indication information, a slot n is determined according to the first offset, n being an integer greater than or equal to 0;

the terminal device determines a first slot and a second slot according to the slot n, and receives the first signal in the first CSI-RS resource group on the first slot and the second slot.

Optionally, in the embodiment 3, the first CSI-RS resource group includes a first CSI-RS resource, a second CSI-RS resource, a third CSI-RS resource, and a fourth CSI-RS resources.

Specifically, the terminal device may receive the first signal by following manners.

In a first manner, the terminal device determines that the first signals in the first CSI-RS resource and the second CSI-RS resource are received on the first slot and the first signals in the third CSI-RS resource and the fourth CSI-RS resource are received on the second slot, according to a position sequence of the four CSI-RS resources in configuration information of the first CSI-RS resource group, wherein the position sequence of the four CSI-RS resources in configuration information of the first CSI-RS resource group is the first CSI-RS resource> the third CSI-RS resource, the first CSI-RS resource> the fourth CSI-RS resource, the second CSI-RS resource> the third CSI-RS resource, the second CSI-RS resource> the fourth CSI-RS resource, or the position sequence of the four CSI-RS resources in configuration information of the first CSI-RS resource group is the third CSI-RS resource> the first CSI-RS resource, the third CSI-RS resource> a second CSI-RS resource, the fourth CSI-RS resource> the first CSI-RS resource, the fourth CSI-RS resource> the second CSI-RS resource.

In the second manner, the terminal device determines that the first signals in the first CSI-RS resource and the second CSI-RS resource are received on the first slot and the first signals in the third CSI-RS resource and the fourth CSI-RS resource are received on the second slot, according to identifiers IDs of four CSI-RS resources in the first CSI-RS resource group, wherein an order of IDs of the four CSI-RS resources in the first CSI-RS resource group is the first CSI-RS resource> the third CSI-RS resource, the first CSI-RS resource> the fourth CSI-RS a resource, the second CSI-RS resource> the third CSI-RS resource, the second CSI-RS resource> the fourth CSI-RS resource, or an order of IDs of the four CSI-RS resources in the first CSI-RS resource group is the third CSI-RS resource> the first CSI-RS resource, the third CSI-RS resource> the second CSI-RS resource, the four CSI-RS resources> the first CSI-RS resource, the fourth CSI-RS resource> the second CSI-RS resource.

In the third manner, the terminal device receives the first signals in the first CSI-RS resource and the second CSI-RS resource on the first slot and receives the first signals in the third CSI-RS resource and the fourth CSI-RS resource on the second slot, wherein the first CSI-RS resource and the third CSI-RS resource belong to one resource set, and the second CSI-RS resource and the fourth CSI-RS resource belong to one resource set, the first CSI-RS resource and the third CSI-RS resource at least have identical time domain and/or frequency domain resource configuration, and the second CSI-RS resource and the fourth CSI-RS resource at least have identical time domain and/or frequency domain resource configuration.

Optionally, in this embodiment 3, the first slot is the slot n, and the second slot is a slot n+1; or the first slot is a slot n−1, and the second slot is the slot n; or the first slot is the slot n, the second slot is a slot m, and the slot m is a first valid downlink slot after the slot n capable of transmitting the first signal.

Embodiment 4

The first configuration information is further used for indicating a second offset for the at least one CSI-RS resource group, the at least one CSI-RS resource group includes a first CSI-RS resource group, P=4, Q=2. In other words, the first CSI-RS resource group includes 4 CSI-RS resources, and the first signal occupies 2 slots.

It should be understood that the first offset and the second offset indicated by the first configuration information are offsets for the first CSI-RS resource group.

Specifically, in this embodiment 4, when the terminal device receives the first indication information, a slot n and a slot m are determined according to the first offset and the second offset, n and m being integers greater than or equal to 0;

the terminal device receives the first signal in the first CSI-RS resource group on the slot n and the slot m.

Optionally, in the embodiment 4, the first CSI-RS resource group includes a first CSI-RS resource, a second CSI-RS resource, a third CSI-RS resource, and a fourth CSI-RS resources, Specifically, the terminal device may receive the first signal by following manners.

In a manner a, the terminal device determines that the first signals in the first CSI-RS resource and the second CSI-RS resource are received on the slot n and the first signals in the third CSI-RS resource and the fourth CSI-RS resource are received on the slot m, according to a position sequence of the four CSI-RS resources in configuration information of the first CSI-RS resource group, wherein the position sequence of the four CSI-RS resources in configuration information of the first CSI-RS resource group is the first CSI-RS resource> the third CSI-RS resource, the first CSI-RS resource> the fourth CSI-RS resource, the second CSI-RS resource> the third CSI-RS resource, the second CSI-RS resource> the fourth CSI-RS resource, or the position sequence of the four CSI-RS resources in configuration information of the first CSI-RS resource group is the third CSI-RS resource> the first CSI-RS resource, the third CSI-RS resource> a second CSI-RS resource, the fourth CSI-RS resource> the first CSI-RS resource, the fourth CSI-RS resource> the second CSI-RS resource.

In a manner b, the terminal device determines that the first signals in the first CSI-RS resource and the second CSI-RS resource are received on the slot n and the first signals in the third CSI-RS resource and the fourth CSI-RS resource are received on the slot m, according to identifiers IDs of four CSI-RS resources in the first CSI-RS resource group, wherein an order of IDs of the four CSI-RS resources in the first CSI-RS resource group is the first CSI-RS resource> the third CSI-RS resource, the first CSI-RS resource> the fourth CSI-RS a resource, the second CSI-RS resource> the third CSI-RS resource, the second CSI-RS resource> the fourth CSI-RS resource, or an order of IDs of the four CSI-RS resources in the first CSI-RS resource group is the third CSI-RS resource> the first CSI-RS resource, the third CSI-RS resource> the second CSI-RS resource, the four CSI-RS resources> the first CSI-RS resource, the fourth CSI-RS resource> the second CSI-RS resource.

In a manner c, the terminal device receives the first signals in the first CSI-RS resource and the second CSI-RS resource on the slot n and receives the first signals in the third CSI-RS resource and the fourth CSI-RS resource on the slot m, wherein the first CSI-RS resource and the third CSI-RS resource belong to one resource set, and the second CSI-RS resource and the fourth CSI-RS resource belong to one resource set, the first CSI-RS resource and the third CSI-RS resource at least have identical time domain and/or frequency domain resource configuration, and the second CSI-RS resource and the fourth CSI-RS resource at least have identical time domain and/or frequency domain resource configuration.

Optionally, in this embodiment 4, when the terminal device receives the first indication information, the slot n is determined according to the first offset and the slot m is determined according to the second offset; or when the terminal device receives the first indication information, the slot n is determined according to the first offset and the slot m is determined according to the first offset and the second offset.

Optionally, in this embodiment 4, the slot n and the slot m are two consecutive slots; or the slot m is a first valid downlink slot after the slot n capable of transmitting the first signal.

Embodiment 5

The at least one CSI-RS resource group includes a first CSI-RS resource group, and the first configuration information is further used for indicating a third offset for each CSI-RS resource in the first CSI-RS resource group, P=4, Q=2. In other words, the first CSI-RS resource group includes 4 CSI-RS resources, and the first signal occupies 2 slots.

It should be understood that the first offset indicated by the first configuration information is an offset for the first CSI-RS resource group. At the same time, each CSI-RS resource in the first CSI-RS resource group has its own corresponding third offset.

Specifically, in this embodiment 5, when the terminal device receives the first indication information, the slot n is determined according to the first offset and a third offset for a first CSI-RS resource, or, when the terminal device receives the first indication information, the slot n is determined according to the third offset for a first CSI-RS resource, wherein the first CSI-RS resource is any one CSI-RS resource in four CSI-RS resources of the first CSI-RS resource group, n being an integer greater than or equal to 0;

the terminal device receives the first signal in the first CSI-RS resource on the slot n.

It should be understood that, in the embodiment 5, the first CSI-RS resource is taken as an example, and other CSI-RS resources in the first CSI-RS resource group are also applicable.

Optionally, in the embodiment 5, the third offset is specifically configured in the first CSI-RS resource group, or specifically configured in its corresponding CSI-RS resource.

Optionally, as an example, if the third offset is specifically configured in the first CSI-RS resource group, a part or all of the CSI-RS resources in the first CSI-RS resource group is configured with the third offset.

Further, if the first CSI-RS resource group includes at least one CSI-RS resource not configured with the third offset, the first configuration information indicates that the third offset corresponding to each CSI-RS resource of the at least one CSI-RS resource not configured with the third offset is a pre-configured value.

Further, the pre-configured value is zero.

Optionally, as another example, if the third offset is specifically configured in its corresponding CSI-RS resource, the first CSI-RS resource group includes a second CSI-RS resource, If the second CSI-RS resource is not configured with the third offset, the first configuration information indicates that the third offset corresponding to the second CSI-RS resource is a pre-configured value.

Further, the pre-configured value is zero.

Further, if the third offset is specifically configured in its corresponding CSI-RS resource, the third offset corresponding to the first CSI-RS resource is determined according to an offset obtained by interpreting indication corresponding to a field based on periodic signal configuration.

For example, after interpreting this field according to the periodic signal, <cycle+offset> may be obtained. Herein, the third offset is obtained by only taking the corresponding offset and ignoring the period.

As another example, the field interpreted by the periodic signal may be defined as the third offset.

Embodiment 6

The at least one CSI-RS resource group includes a first CSI-RS resource group and a second CSI-RS resource group, P=Q=2. In other words, the first CSI-RS resource group includes two CSI-RS resources, and the first signal occupies 2 slots.

It should be understood that the first configuration information may indicate a first offset corresponding to the first CSI-RS resource group and a first offset corresponding to the second CSI-RS resource group.

Specifically, in this embodiment 6, when the terminal device receives the first indication information, the slot n is determined according to the first offset corresponding to the first CSI-RS resource group, and the slot m is determined according to the first offset corresponding to the second CSI-RS resource group, n and m being integers greater than or equal to 0;

the terminal device receives the first signal in the first CSI-RS resource group on the slot n, and receives the first signal in the second CSI-RS resource group on the slot m.

It should be noted that the first CSI-RS resource group and the second CSI-RS resource group are associated with two reporting configurations, and the two reporting configurations are associated with one DCI trigger state (CSI-AperiodicTriggerState). The terminal device receives the corresponding DCI indication of the network device, and obtains offsets corresponding to the first CSI-RS resource group and the second CSI-RS resource group respectively, and determines that corresponding CSI-RS resources are received on the slot n and the slot m.

Optionally, in this embodiment 6, the first offset corresponding to the first CSI-RS resource group and the first offset corresponding to the second CSI-RS resource group differ by K slots, K being an integer greater than or equal to 1.

For example, K=1. In other words, the first offset corresponding to the first CSI-RS resource group and the first offset corresponding to the second CSI-RS resource group differ by one slot.

Therefore, in the embodiment of the present application, the terminal device may receive the first signal according to the first configuration information, so that the tracking/synchronization of frequency and/or timing may be performed by using the first signal, which improves tracking/synchronization performance of frequency and/or timing, and improve overall system performance.

FIG. 3 is a schematic flowchart of an information determining method 300 according to an embodiment of the present application. The method 300 may be optionally applied to the system shown in FIG. 1, but is not limited thereto. The method 300 includes at least a portion of the following.

In step S310, a network device sends first configuration information to a terminal device, wherein the first configuration information is used for configuring at least one Channel State Information Reference Signal CSI-RS resource group and used for indicating a first offset for the at least one CSI-RS resource group, each CSI-RS resource group includes P number of CSI-RS resources, the at least one CSI-RS resource group is used for determining a first signal, and the first signal occupies Q number of slots, P and Q being integers greater than or equal to 2.

Optionally, the terminal device uses the first signal for tracking/synchronization of frequency and/or timing.

Optionally, the first configuration information is further used for configuring a first indication parameter corresponding to the at least one CSI-RS resource group, the first indication parameter is used for indicating use of the at least one CSI-RS resource group.

Optionally, the first indication parameter is a parameter trs-Info.

Optionally, the first signal is an aperiodic CSI-RS for Tracking. This first signal may also be referred to as an Aperiodic Tracking Reference Signal (A-TRS).

Optionally, the first configuration information is radio resource control RRC signaling.

In step S320, the network device sends first indication information to the terminal device, wherein the first indication information is used for triggering the terminal device to receive the first signal.

Optionally, the first indication information is DCI signaling.

In step S330, the network device sends the first signal to the terminal device according to the first configuration information.

The information determining method 300 in the embodiment of the present application is described below with reference to specific embodiments.

Embodiment 1

The at least one CSI-RS resource group includes a first CSI-RS resource group, P=Q=2.

Specifically, in this embodiment 1,
when the network device sends the first indication information, a slot n is determined according to the first offset, n being an integer greater than or equal to 0;
the network device determines a first slot and a second slot according to the slot n, and sends the first signal in the first CSI-RS resource group to the terminal device on the first slot and the second slot.

Optionally, in this embodiment 1,
the first slot is the slot n, and the second slot is a slot n+1; or
the first slot is a slot n−1, and the second slot is the slot n; or
the first slot is the slot n, the second slot is a slot m, and the slot m is a first valid downlink slot after the slot n capable of transmitting the first signal.

Embodiment 2

The first configuration information is further used for indicating a second offset for the at least one CSI-RS resource group, the at least one CSI-RS resource group includes a first CSI-RS resource group, P=Q=2.

Specifically, in this embodiment 2,
when the network device sends the first indication information, a slot n and a slot m are determined according to the first offset and the second offset, n and m being integers greater than or equal to 0;
the network device sends the first signal in the first CSI-RS resource group to the terminal device on the slot n and the slot m.

Optionally, in this embodiment 2,
when the network device sends the first indication information, the slot n is determined according to the first offset and the slot m is determined according to the second offset;
or
when the network device sends the first indication information, the slot n is determined according to the first offset and the slot m is determined according to the first offset and the second offset.

Optionally, in this embodiment 2,
the slot n and the slot m are two consecutive slots; or
the slot m is a first valid downlink slot after the slot n capable of transmitting the first signal.

Embodiment 3

The at least one CSI-RS resource group includes a first CSI-RS resource group, P=4, Q=2.

Specifically, in this embodiment 3,
when the network device sends the first indication information, a slot n is determined according to the first offset, n being an integer greater than or equal to 0;
the network device determines a first slot and a second slot according to the slot n, and sends the first signal in the first CSI-RS resource group to the terminal device on the first slot and the second slot.

Optionally, in the embodiment 3, the first CSI-RS resource group includes a first CSI-RS resource, a second CSI-RS resource, a third CSI-RS resource, and a fourth CSI-RS resources.

Specifically, the network device may send the first signal by following manners.

In a first manner, the network device determines that the first signals in the first CSI-RS resource and the second CSI-RS resource are sent on the first slot and the first signals in the third CSI-RS resource and the fourth CSI-RS resource are sent on the second slot, according to a position sequence of the four CSI-RS resources in configuration information of the first CSI-RS resource group, wherein the position sequence of the four CSI-RS resources in configuration information of the first CSI-RS resource group is the first CSI-RS resource> the third CSI-RS resource, the first CSI-RS resource> the fourth CSI-RS resource, the second CSI-RS resource> the third CSI-RS resource, the second CSI-RS resource> the fourth CSI-RS resource, or the position sequence of the four CSI-RS resources in configuration information of the first CSI-RS resource group is the third CSI-RS resource> the first CSI-RS resource, the third CSI-RS resource> a second CSI-RS resource, the fourth CSI-RS resource> the first CSI-RS resource, the fourth CSI-RS resource> the second CSI-RS resource.

In a second manner, the network device determines that the first signals in the first CSI-RS resource and the second CSI-RS resource are sent on the first slot and the first signals in the third CSI-RS resource and the fourth CSI-RS resource are sent on the second slot, according to identifiers IDs of four CSI-RS resources in the first CSI-RS resource group, wherein an order of IDs of the four CSI-RS resources in the first CSI-RS resource group is the first CSI-RS resource> the third CSI-RS resource, the first CSI-RS resource> the fourth CSI-RS a resource, the second CSI-RS resource> the third CSI-RS resource, the second CSI-RS resource> the fourth CSI-RS resource, or an order of IDs of the four CSI-RS resources in the first CSI-RS resource group is the third CSI-RS resource> the first CSI-RS resource, the third CSI-RS resource> the second CSI-RS resource, the four CSI-RS resources> the first CSI-RS resource, the fourth CSI-RS resource> the second CSI-RS resource.

In a third manner, the network device sends the first signals in the first CSI-RS resource and the second CSI-RS resource on the first slot and sends the first signals in the third CSI-RS resource and the fourth CSI-RS resource on the second slot, wherein the first CSI-RS resource and the third CSI-RS resource belong to one resource set, and the second CSI-RS resource and the fourth CSI-RS resource belong to one resource set, the first CSI-RS resource and the third CSI-RS resource at least have identical time domain and/or frequency domain resource configuration, and the second CSI-RS resource and the fourth CSI-RS resource at least have identical time domain and/or frequency domain resource configuration.

Optionally, in this embodiment 3,
the first slot is the slot n, and the second slot is a slot n+1; or
the first slot is a slot n−1, and the second slot is the slot n; or
the first slot is the slot n, the second slot is a slot m, and the slot m is a first valid downlink slot after the slot n capable of transmitting the first signal.

Embodiment 4

The first configuration information is further used for indicating a second offset for the at least one CSI-RS resource group, the at least one CSI-RS resource group includes a first CSI-RS resource group, P=4, Q=2.

Specifically, in this embodiment 4,
when the network device sends the first indication information, a slot n and a slot m are determined according to the first offset and the second offset, n and m being integers greater than or equal to 0;
the network device sends the first signal in the first CSI-RS resource group to the terminal device on the slot n and the slot m.

Optionally, in the fourth embodiment, the first CSI-RS resource group includes a first CSI-RS resource, a second CSI-RS resource, a third CSI-RS resource, and a fourth CSI-RS resources, Specifically, the network device may send the first signal by following manners.

In a manner a, the network device determines that the first signals in the first CSI-RS resource and the second CSI-RS resource are sent on the slot n and the first signals in the third CSI-RS resource and the fourth CSI-RS resource are sent on the slot m, according to a position sequence of the four CSI-RS resources in configuration information of the first CSI-RS resource group, wherein the position sequence of the four CSI-RS resources in configuration information of the first CSI-RS resource group is the first CSI-RS resource> the third CSI-RS resource, the first CSI-RS resource> the fourth CSI-RS resource, the second CSI-RS resource> the third CSI-RS resource, the second CSI-RS resource> the fourth CSI-RS resource, or the position sequence of the four CSI-RS resources in configuration information of the first CSI-RS resource group is the third CSI-RS resource> the first CSI-RS resource, the third CSI-RS resource> a second CSI-RS resource, the fourth CSI-RS resource> the first CSI-RS resource, the fourth CSI-RS resource> the second CSI-RS resource.

In a manner b, the network device determines that the first signals in the first CSI-RS resource and the second CSI-RS resource are sent on the slot n and the first signals in the third CSI-RS resource and the fourth CSI-RS resource are sent on the slot m, according to identifiers IDs of four CSI-RS resources in the first CSI-RS resource group, wherein an order of IDs of the four CSI-RS resources in the first CSI-RS resource group is the first CSI-RS resource> the third CSI-RS resource, the first CSI-RS resource> the fourth CSI-RS a resource, the second CSI-RS resource> the third CSI-RS resource, the second CSI-RS resource> the fourth CSI-RS resource, or an order of IDs of the four CSI-RS resources in the first CSI-RS resource group is the third CSI-RS resource> the first CSI-RS resource, the third CSI-RS resource> the second CSI-RS resource, the four CSI-RS resources> the first CSI-RS resource, the fourth CSI-RS resource> the second CSI-RS resource.

In a manner c, the network device sends the first signals in the first CSI-RS resource and the second CSI-RS resource on the slot n and sends the first signals in the third CSI-RS resource and the fourth CSI-RS resource on the slot m, wherein the first CSI-RS resource and the third CSI-RS resource belong to one resource set, and the second CSI-RS resource and the fourth CSI-RS resource belong to one resource set, the first CSI-RS resource and the third CSI-RS resource at least have identical time domain and/or frequency domain resource configuration, and the second CSI-RS resource and the fourth CSI-RS resource at least have identical time domain and/or frequency domain resource configuration.

Optionally, in this embodiment 4,
when the network device sends the first indication information, the slot n is determined according to the first offset and the slot m is determined according to the second offset; or
when the network device sends the first indication information, the slot n is determined according to the first offset and the slot m is determined according to the first offset and the second offset.

Optionally, in this embodiment 4,
the slot n and the slot m are two consecutive slots; or
the slot m is a first valid downlink slot after the slot n capable of transmitting the first signal.

Embodiment 5

The at least one CSI-RS resource group includes a first CSI-RS resource group, and the first configuration information is further used for indicating a third offset for each CSI-RS resource in the first CSI-RS resource group, P=4, Q=2.

Specifically, in this embodiment 5,
when the network device sends the first indication information, the slot n is determined according to the first offset and a third offset for a first CSI-RS resource, or, when the network device sends the first indication information, the slot n is determined according to the third offset for a first CSI-RS resource, wherein the first CSI-RS resource is any one CSI-RS resource in four CSI-RS resources of the first CSI-RS resource group, n being an integer greater than or equal to 0;

the network device sends the first signal in the first CSI-RS resource to the terminal device on the slot n.

Optionally, in the embodiment 5, the third offset is specifically configured in the first CSI-RS resource group, or specifically configured in its corresponding CSI-RS resource.

Optionally, as an example, if the third offset is specifically configured in the first CSI-RS resource group, a part or all of the CSI-RS resources in the first CSI-RS resource group is configured with the third offset.

Further, if the first CSI-RS resource group includes at least one CSI-RS resource not configured with the third offset, the first configuration information indicates that the third offset corresponding to each CSI-RS resource of the at least one CSI-RS resource not configured with the third offset is a pre-configured value.

Further, the pre-configured value is zero.

Optionally, as another example, if the third offset is specifically configured in its corresponding CSI-RS resource, the first CSI-RS resource group includes a second CSI-RS resource, if the second CSI-RS resource is not configured with the third offset, the first configuration information indicates that the third offset corresponding to the second CSI-RS resource is a pre-configured value.

Further, the pre-configured value is zero.

Further, if the third offset is specifically configured in its corresponding CSI-RS resource, the third offset corresponding to the first CSI-RS resource is determined according to an offset obtained by interpreting indication corresponding to a field based on periodic signal configuration.

For example, after interpreting this field according to the periodic signal, <cycle+offset> may be obtained. Herein, the third offset is obtained by only taking the corresponding offset and ignoring the period.

As another example, the field interpreted by the periodic signal may be defined as the third offset.

Embodiment 6

The at least one CSI-RS resource group includes a first CSI-RS resource group and a second CSI-RS resource group, P=Q=2.

Specifically, in this embodiment 6, when the network device sends the first indication information, the slot n is determined according to the first offset corresponding to the first CSI-RS resource group, and the slot m is determined according to the first offset corresponding to the second CSI-RS resource group, n and m being integers greater than or equal to 0;

the network device sends the first signal in the first CSI-RS resource group to the terminal device on the slot n, and sends the first signal in the second CSI-RS resource group to the terminal device on the slot m.

It should be noted that the first CSI-RS resource group and the second CSI-RS resource group are associated with two reporting configurations, and the two reporting configurations are associated with one DCI trigger state (CSI-AperiodicTriggerState). The terminal device receives the corresponding DCI indication of the network device, and obtains offsets corresponding to the first CSI-RS resource group and the second CSI-RS resource group respectively, and determines that corresponding CSI-RS resources are received on the slot n and the slot m.

Optionally, in this embodiment 6, the first offset corresponding to the first CSI-RS resource group and the first offset corresponding to the second CSI-RS resource group differ by K slots, K being an integer greater than or equal to 1.

For example, K=1. In other words, the first offset corresponding to the first CSI-RS resource group and the first offset corresponding to the second CSI-RS resource group differ by one slot.

It should be understood that the steps in the information determining method 300 may refer to corresponding steps in the information determining 200, and are not described herein again for brevity.

Therefore, in the embodiment of the present application, the network device sends the first configuration information to the terminal device, sends the first indication information for triggering the terminal device to receive the first signal to the terminal device, and sends the first signal according to the first configuration information, so that the terminal device may receive the first signal according to the first configuration information, thus the tracking/synchronization of frequency and/or timing may be performed by using the first signal, which improves tracking/synchronization performance of frequency and/or timing, and improve overall system performance.

Figure 4:
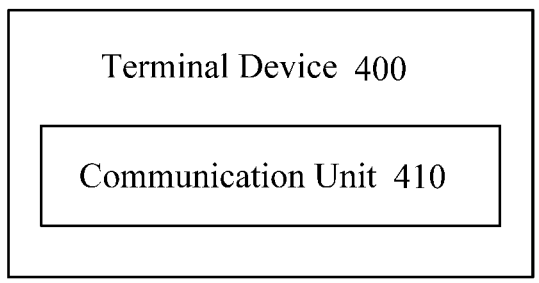
FIG. 4 is a schematic block diagram of a terminal device according to an embodiment of the present application.

FIG. 4 is a schematic block diagram of a terminal device 400 according to an embodiment of the present application. As shown in FIG. 4, the terminal device 400 includes:

a communication unit 410, configured to receive first configuration information sent by a network device, wherein the first configuration information is used for configuring at least one Channel State Information Reference Signal CSI-RS resource group and used for indicating a first offset for the at least one CSI-RS resource group, each CSI-RS resource group includes P number of CSI-RS resources, the at least one CSI-RS resource group is used for determining a first signal, and the first signal occupies Q number of slots, P and Q being integers greater than or equal to 2, wherein the communication unit 410 is further configured to receive first indication information sent by the network device, the first indication information is used for triggering the terminal device to receive the first signal;

the communication unit 410 is further configured to receive the first signal according to the first configuration information in response to the first indication information.

Optionally, the terminal device uses the first signal for tracking/synchronization of frequency and/or timing.

Optionally, the first configuration information is further used for configuring a first indication parameter corresponding to the at least one CSI-RS resource group, the first indication parameter is used for indicating use of the at least one CSI-RS resource group.

Optionally, the first indication parameter is a parameter trs-Info.

Optionally, the at least one CSI-RS resource group includes a first CSI-RS resource group, P=Q=2, the terminal device 400 further includes a processing unit 420, when the communication unit 410 receives the first indication information, the processing unit 420 determines a slot n according to the first offset, n being an integer greater than or equal to 0;

the processing unit 420 determines a first slot and a second slot according to the slot n, and the communication unit 410 receives the first signal in the first CSI-RS resource group on the first slot and the second slot.

Optionally, the first slot is the slot n, and the second slot is a slot n+1; or the first slot is a slot n−1, and the second slot is the slot n; or the first slot is the slot n, the second slot is a slot m, and the slot m is a first valid downlink slot after the slot n capable of transmitting the first signal.

Optionally, the first configuration information is further used for indicating a second offset for the at least one CSI-RS resource group, the at least one CSI-RS resource group includes a first CSI-RS resource group, P=Q=2, the terminal device 400 further includes a processing unit 420, when the communication unit 410 receives the first indication information, the processing unit 420 determines a slot n and a slot m according to the first offset and the second offset, n and m being integers greater than or equal to 0;

the communication unit 410 receives the first signal in the first CSI-RS resource group on the slot n and the slot m.

Optionally, the processing unit 420 is specifically configured to:

when the communication unit 410 receives the first indication information, determine the slot n according to the first offset and determine the slot m according to the second offset; or when the communication unit 410 receives the first indication information, determine the slot n according to the first offset and determine the slot m according to the first offset and the second offset.

Optionally, the slot n and the slot m are two consecutive slots; or the slot m is a first valid downlink slot after the slot n capable of transmitting the first signal.

Optionally, the at least one CSI-RS resource group includes a first CSI-RS resource group, P=4, Q=2, the terminal device 400 further includes a processing unit 420, when the communication unit 410 receives the first indication information, the processing unit 420 determines a slot n according to the first offset, n being an integer greater than or equal to 0;

the processing unit 420 determines a first slot and a second slot according to the slot n, and the communication unit 410 receives the first signal in the first CSI-RS resource group on the first slot and the second slot.

Optionally, the first CSI-RS resource group includes a first CSI-RS resource, a second CSI-RS resource, a third CSI-RS resource, and a fourth CSI-RS resources, the communication unit 410 is specifically configured to:

determine that the first signals in the first CSI-RS resource and the second CSI-RS resource are received on the first slot and the first signals in the third CSI-RS resource and the fourth CSI-RS resource are received on the second slot, according to a position sequence of the four CSI-RS resources in configuration information of the first CSI-RS resource group, wherein the position sequence of the four CSI-RS resources in configuration information of the first CSI-RS resource group is the first CSI-RS resource> the third CSI-RS resource, the first CSI-RS resource> the fourth CSI-RS resource, the second CSI-RS resource> the third CSI-RS resource, the second CSI-RS resource> the fourth CSI-RS resource, or the position sequence of the four CSI-RS resources in configuration information of the first CSI-RS resource group is the third CSI-RS resource> the first CSI-RS resource, the third CSI-RS resource> a second CSI-RS resource, the fourth CSI-RS resource> the first CSI-RS resource, the fourth CSI-RS resource> the second CSI-RS resource; or determine that the first signals in the first CSI-RS resource and the second CSI-RS resource are received on the first slot and the first signals in the third CSI-RS resource and the fourth CSI-RS resource are received on the second slot, according to identifiers IDs of four CSI-RS resources in the first CSI-RS resource group, wherein an order of IDs of the four CSI-RS resources in the first CSI-RS resource group is the first CSI-RS resource> the third CSI-RS resource, the first CSI-RS resource> the fourth CSI-RS a resource, the second CSI-RS resource> the third CSI-RS resource, the second CSI-RS resource> the fourth CSI-RS resource, or an order of IDs of the four CSI-RS resources in the first CSI-RS resource group is the third CSI-RS resource> the first CSI-RS resource, the third CSI-RS resource> the second CSI-RS resource, the four CSI-RS resources> the first CSI-RS resource, the fourth CSI-RS resource> the second CSI-RS resource; or receive the first signals in the first CSI-RS resource and the second CSI-RS resource on the first slot and receive the first signals in the third CSI-RS resource and the fourth CSI-RS resource on the second slot, wherein the first CSI-RS resource and the third CSI-RS resource belong to one resource set, and the second CSI-RS resource and the fourth CSI-RS resource belong to one resource set, the first CSI-RS resource and the third CSI-RS resource at least have identical time domain and/or frequency domain resource configuration, and the second CSI-RS resource and the fourth CSI-RS resource at least have identical time domain and/or frequency domain resource configuration.

Optionally, the first slot is the slot n, and the second slot is a slot n+1; or the first slot is a slot n−1, and the second slot is the slot n; or the first slot is the slot n, the second slot is a slot m, and the slot m is a first valid downlink slot after the slot n capable of transmitting the first signal.

Optionally, the first configuration information is further used for indicating a second offset for the at least one CSI-RS resource group, the at least one CSI-RS resource group includes a first CSI-RS resource group, P=4, Q=2, the terminal device 400 further includes a processing unit 420, when the communication unit 410 receives the first indication information, the processing unit 420 determines a slot n and a slot m according to the first offset and the second offset, n and m being integers greater than or equal to 0;

the communication unit 410 receives the first signal in the first CSI-RS resource group on the slot n and the slot m.

Optionally, the first CSI-RS resource group includes a first CSI-RS resource, a second CSI-RS resource, a third CSI-RS resource, and a fourth CSI-RS resources, the communication unit 410 is specifically configured to:

determine that the first signals in the first CSI-RS resource and the second CSI-RS resource are received on the slot n and the first signals in the third CSI-RS resource and the fourth CSI-RS resource are received on the slot m, according to a position sequence of the four CSI-RS resources in configuration information of the first CSI-RS resource group, wherein the position sequence of the four CSI-RS resources in configuration information of the first CSI-RS resource group is the first CSI-RS resource> the third CSI-RS resource, the first CSI-RS resource> the fourth CSI-RS resource, the second CSI-RS resource> the third CSI-RS resource, the second CSI-RS resource> the fourth CSI-RS resource, or the position sequence of the four CSI-RS resources in configuration information of the first CSI-RS resource group is the third CSI-RS resource> the first CSI-RS resource, the third CSI-RS resource> a second CSI-RS resource, the fourth CSI-RS resource> the first CSI-RS resource, the fourth CSI-RS resource> the second CSI-RS resource; or determine that the first signals in the first CSI-RS resource and the second CSI-RS resource are received on the slot n and the first signals in the third CSI-RS resource and the fourth CSI-RS resource are received on the slot m, according to identifiers IDs of four CSI-RS resources in the first CSI-RS resource group, wherein an order of IDs of the four CSI-RS resources in the first CSI-RS resource group is the first CSI-RS resource> the third CSI-RS resource, the first CSI-RS resource> the fourth CSI-RS a resource, the second CSI-RS resource> the third CSI-RS resource, the second CSI-RS resource> the fourth CSI-RS resource, or an order of IDs of the four CSI-RS resources in the first CSI-RS resource group is the third CSI-RS resource> the first CSI-RS resource, the third CSI-RS resource> the second CSI-RS resource, the four CSI-RS resources> the first CSI-RS resource, the fourth CSI-RS resource> the second CSI-RS resource; or receive the first signals in the first CSI-RS resource and the second CSI-RS resource on the slot n and receive the first signals in the third CSI-RS resource and the fourth CSI-RS resource on the slot m, wherein the first CSI-RS resource and the third CSI-RS resource belong to one resource set, and the second CSI-RS resource and the fourth CSI-RS resource belong to one resource set, the first CSI-RS resource and the third CSI-RS resource at least have identical time domain and/or frequency domain resource configuration, and the second CSI-RS resource and the fourth CSI-RS resource at least have identical time domain and/or frequency domain resource configuration.

Optionally, the processing unit 420 is specifically configured to:

when the first indication information is received, determine the slot n according to the first offset and determine the slot m according to the second offset; or when the first indication information is received, determine the slot n according to the first offset and determine the slot m according to the first offset and the second offset.

Optionally, the slot n and the slot m are two consecutive slots; or the slot m is a first valid downlink slot after the slot n capable of transmitting the first signal.

Optionally, the at least one CSI-RS resource group includes a first CSI-RS resource group, and the first configuration information is further used for indicating a third offset for each CSI-RS resource in the first CSI-RS resource group, P=4, Q=2, the terminal device 400 further includes a processing unit 420, when the communication unit 410 receives the first indication information, the processor unit 420 determines the slot n according to the first offset and a third offset for a first CSI-RS resource, or, when the communication unit 410 receives the first indication information, the processor unit 420 determines the slot n according to the third offset for a first CSI-RS resource, wherein the first CSI-RS resource is any one CSI-RS resource in four CSI-RS resources of the first CSI-RS resource group, n being an integer greater than or equal to 0;

the communication unit 410 receives the first signal in the first CSI-RS resource on the slot n.

Optionally, the third offset is specifically configured in the first CSI-RS resource group, or specifically configured in its corresponding CSI-RS resource.

Optionally, if the third offset is specifically configured in the first CSI-RS resource group, a part or all of the CSI-RS resources in the first CSI-RS resource group is configured with the third offset.

Optionally, if the first CSI-RS resource group includes at least one CSI-RS resource not configured with the third offset, the first configuration information indicates that the third offset corresponding to each CSI-RS resource of the at least one CSI-RS resource not configured with the third offset is a pre-configured value.

Optionally, if the third offset is specifically configured in its corresponding CSI-RS resource, the first CSI-RS resource group includes a second CSI-RS resource, if the second CSI-RS resource is not configured with the third offset, the first configuration information indicates that the third offset corresponding to the second CSI-RS resource is a pre-configured value.

Optionally, the pre-configured value is zero.

Optionally, if the third offset is specifically configured in its corresponding CSI-RS resource, the third offset corresponding to the first CSI-RS resource is determined according to an offset obtained by interpreting indication corresponding to a field based on periodic signal configuration.

Optionally, the at least one CSI-RS resource group includes a first CSI-RS resource group and a second CSI-RS resource group, P=Q=2, the terminal device 400 further includes a processing unit 420, when the communication unit 410 receives the first indication information, the processing unit 420 determines the slot n according to the first offset corresponding to the first CSI-RS resource group, and determines the slot m according to the first offset corresponding to the second CSI-RS resource group, n and m being integers greater than or equal to 0;

the communication unit 410 receives the first signal in the first CSI-RS resource group on the slot n, and receives the first signal in the second CSI-RS resource group on the slot m.

Optionally, the first offset corresponding to the first CSI-RS resource group and the first offset corresponding to the second CSI-RS resource group differ by K slots, K being an integer greater than or equal to 1.

Optionally, K=1.

Optionally, the first signal is an aperiodic CSI-RS for Tracking.

Optionally, the first configuration information is radio resource control RRC signaling, and the first indication information is downlink control information DCI signaling.

It should be understood that the above-mentioned and other operations and/or functions of the respective modules in the terminal device 400 according to the embodiment of the present application respectively aim to implement the corresponding processes of the terminal device in the method 200 in FIG. 2, and are not described herein for brevity.

Figure 5:
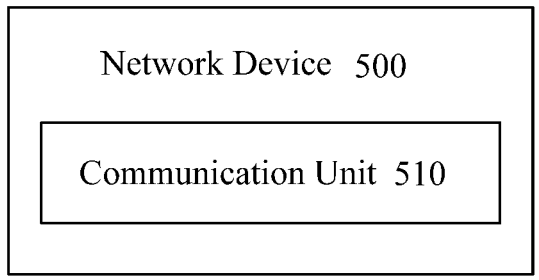
FIG. 5 is a schematic block diagram of a network device according to an embodiment of the present application.

FIG. 5 is a schematic block diagram of a network device 500 in accordance with an embodiment of the present application. As shown in FIG. 5, the network device 500 includes:

a communication unit 510, configured to send first configuration information to a terminal device, wherein the first configuration information is used for configuring at least one Channel State Information Reference Signal CSI-RS resource group and used for indicating a first offset for the at least one CSI-RS resource group, each CSI-RS resource group includes P number of CSI-RS resources, the at least one CSI-RS resource group is used for determining a first signal, and the first signal occupies Q number of slots, P and Q being integers greater than or equal to 2, wherein the communication unit 510 is configured to send first indication information to the terminal device, the first indication information is used for triggering the terminal device to receive the first signal; and wherein the communication unit 510 is configured to send the first signal to the terminal device according to the first configuration information.

Optionally, the terminal device uses the first signal for tracking/synchronization of frequency and/or timing.

Optionally, the first configuration information is further used for configuring a first indication parameter corresponding to the at least one CSI-RS resource group, the first indication parameter is used for indicating use of the at least one CSI-RS resource group.

Optionally, the first indication parameter is a parameter trs-Info.

Optionally, the at least one CSI-RS resource group includes a first CSI-RS resource group, P=Q=2, the network device 500 further includes a processing unit 520, when the communication unit 510 sends the first indication information, the processing unit 520 determines a slot n according to the first offset, n being an integer greater than or equal to 0;

the processing unit 520 determines a first slot and a second slot according to the slot n, and the communication unit 510 sends the first signal in the first CSI-RS resource group to the terminal device on the first slot and the second slot.

Optionally, the first slot is the slot n, and the second slot is a slot n+1; or the first slot is a slot n−1, and the second slot is the slot n; or the first slot is the slot n, the second slot is a slot m, and the slot m is a first valid downlink slot after the slot n capable of transmitting the first signal.

Optionally, the first configuration information is further used for indicating a second offset for the at least one CSI-RS resource group, the at least one CSI-RS resource group includes a first CSI-RS resource group, P=Q=2, the network device 500 further includes a processing unit 520, when the communication unit 510 sends the first indication information, the processing unit 520 determines a slot n and a slot m according to the first offset and the second offset, n and m being integers greater than or equal to 0;

the communication unit 510 sends the first signal in the first CSI-RS resource group to the terminal device on the slot n and the slot m.

Optionally, the processing unit 520 is specifically configured to:

when the communication unit 510 sends the first indication information, determine the slot n according to the first offset and determine the slot m according to the second offset; or when the communication unit 510 sends the first indication information, determine the slot n according to the first offset and determine the slot m according to the first offset and the second offset.

Optionally, the slot n and the slot m are two consecutive slots; or the slot m is a first valid downlink slot after the slot n capable of transmitting the first signal.

Optionally, the at least one CSI-RS resource group includes a first CSI-RS resource group, P=4, Q=2, the network device 500 further includes a processing unit 520, when the communication unit 510 sends the first indication information, the processing unit 520 determines a slot n according to the first offset, n being an integer greater than or equal to 0;

the processing unit 520 determines a first slot and a second slot according to the slot n, and the communication unit 510 sends the first signal in the first CSI-RS resource group to the terminal device on the first slot and the second slot.

Optionally, the first CSI-RS resource group includes a first CSI-RS resource, a second CSI-RS resource, a third CSI-RS resource, and a fourth CSI-RS resources, the communication unit 510 is specifically configured to:

determine that the first signals in the first CSI-RS resource and the second CSI-RS resource are sent on the first slot and the first signals in the third CSI-RS resource and the fourth CSI-RS resource are sent on the second slot, according to a position sequence of the four CSI-RS resources in configuration information of the first CSI-RS resource group, wherein the position sequence of the four CSI-RS resources in configuration information of the first CSI-RS resource group is the first CSI-RS resource> the third CSI-RS resource, the first CSI-RS resource> the fourth CSI-RS resource, the second CSI-RS resource> the third CSI-RS resource, the second CSI-RS resource> the fourth CSI-RS resource, or the position sequence of the four CSI-RS resources in configuration information of the first CSI-RS resource group is the third CSI-RS resource> the first CSI-RS resource, the third CSI-RS resource> a second CSI-RS resource, the fourth CSI-RS resource> the first CSI-RS resource, the fourth CSI-RS resource> the second CSI-RS resource; or determine that the first signals in the first CSI-RS resource and the second CSI-RS resource are sent on the first slot and the first signals in the third CSI-RS resource and the fourth CSI-RS resource are sent on the second slot, according to identifiers IDs of four CSI-RS resources in the first CSI-RS resource group, wherein an order of IDs of the four CSI-RS resources in the first CSI-RS resource group is the first CSI-RS resource> the third CSI-RS resource, the first CSI-RS resource> the fourth CSI-RS a resource, the second CSI-RS resource> the third CSI-RS resource, the second CSI-RS resource> the fourth CSI-RS resource, or an order of IDs of the four CSI-RS resources in the first CSI-RS resource group is the third CSI-RS resource> the first CSI-RS resource, the third CSI-RS resource> the second CSI-RS resource, the four CSI-RS resources> the first CSI-RS resource, the fourth CSI-RS resource> the second CSI-RS resource; or send the first signals in the first CSI-RS resource and the second CSI-RS resource on the first slot and send the first signals in the third CSI-RS resource and the fourth CSI-RS resource on the second slot, wherein the first CSI-RS resource and the third CSI-RS resource belong to one resource set, and the second CSI-RS resource and the fourth CSI-RS resource belong to one resource set, the first CSI-RS resource and the third CSI-RS resource at least have identical time domain and/or frequency domain resource configuration, and the second CSI-RS resource and the fourth CSI-RS resource at least have identical time domain and/or frequency domain resource configuration.

Optionally, the first slot is the slot n, and the second slot is a slot n+1; or the first slot is a slot n−1, and the second slot is the slot n; or the first slot is the slot n, the second slot is a slot m, and the slot m is a first valid downlink slot after the slot n capable of transmitting the first signal.

Optionally, the first configuration information is further used for indicating a second offset for the at least one CSI-RS resource group, the at least one CSI-RS resource group includes a first CSI-RS resource group, P=4, Q=2, the network device 500 further includes a processing unit 520, when the communication unit 510 sends the first indication information, the processing unit 520 determines a slot n and a slot m according to the first offset and the second offset, n and m being integers greater than or equal to 0;

the communication unit 510 sends the first signal in the first CSI-RS resource group to the terminal device on the slot n and the slot m.

Optionally, the first CSI-RS resource group includes a first CSI-RS resource, a second CSI-RS resource, a third CSI-RS resource, and a fourth CSI-RS resources, the communication unit 510 is specifically configured to:

determine that the first signals in the first CSI-RS resource and the second CSI-RS resource are sent on the slot n and the first signals in the third CSI-RS resource and the fourth CSI-RS resource are sent on the slot m, according to a position sequence of the four CSI-RS resources in configuration information of the first CSI-RS resource group; or determine that the first signals in the first CSI-RS resource and the second CSI-RS resource are sent on the slot n and the first signals in the third CSI-RS resource and the fourth CSI-RS resource are sent on the slot m, according to identifiers IDs of four CSI-RS resources in the first CSI-RS resource group; or send the first signals in the first CSI-RS resource and the second CSI-RS resource on the slot n and send the first signals in the third CSI-RS resource and the fourth CSI-RS resource on the slot m.

Optionally, the processing unit 520 is specifically configured to:

when the communication unit sends the first indication information, determine the slot n according to the first offset and determine the slot m according to the second offset; or when the communication unit sends the first indication information, determine the slot n according to the first offset and determine the slot m according to the first offset and the second offset.

Optionally, the slot n and the slot m are two consecutive slots; or the slot m is a first valid downlink slot after the slot n capable of transmitting the first signal.

Optionally, the at least one CSI-RS resource group includes a first CSI-RS resource group, and the first configuration information is further used for indicating a third offset for each CSI-RS resource in the first CSI-RS resource group, P=4, Q=2, the network device 500 further includes a processing unit 520, when the communication unit 510 sends the first indication information, the processing unit 520 determines the slot n according to the first offset and a third offset for a first CSI-RS resource, or, when the communication unit 510 sends the first indication information, the processing unit 520 determines the slot n according to the third offset for a first CSI-RS resource, wherein the first CSI-RS resource is any one CSI-RS resource in four CSI-RS resources of the first CSI-RS resource group, n being an integer greater than or equal to 0;

the communication unit 510 sends the first signal in the first CSI-RS resource to the terminal device on the slot n.

Optionally, the third offset is specifically configured in the first CSI-RS resource group, or specifically configured in its corresponding CSI-RS resource.

Optionally, if the third offset is specifically configured in the first CSI-RS resource group, a part or all of the CSI-RS resources in the first CSI-RS resource group is configured with the third offset.

Optionally, if the first CSI-RS resource group includes at least one CSI-RS resource not configured with the third offset, the first configuration information indicates that the third offset corresponding to each CSI-RS resource of the at least one CSI-RS resource not configured with the third offset is a pre-configured value.

Optionally, if the third offset is specifically configured in its corresponding CSI-RS resource, the first CSI-RS resource group includes a second CSI-RS resource, if the second CSI-RS resource is not configured with the third offset, the first configuration information indicates that the third offset corresponding to the second CSI-RS resource is a pre-configured value.

Optionally, the pre-configured value is zero.

Optionally, if the third offset is specifically configured in its corresponding CSI-RS resource, the third offset corresponding to the first CSI-RS resource is determined according to an offset obtained by interpreting indication corresponding to a field based on periodic signal configuration.

Optionally, the at least one CSI-RS resource group includes a first CSI-RS resource group and a second CSI-RS resource group, P=Q=2, the network device 500 further includes a processing unit 520, when the communication unit 510 sends the first indication information, the processing unit 520 determines the slot n according to the first offset corresponding to the first CSI-RS resource group, and determines the slot m according to the first offset corresponding to the second CSI-RS resource group, n and m being integers greater than or equal to 0;

the communication unit 510 sends the first signal in the first CSI-RS resource group to the terminal device on the slot n, and sends the first signal in the second CSI-RS resource group to the terminal device on the slot m.

Optionally, the first offset corresponding to the first CSI-RS resource group and the first offset corresponding to the second CSI-RS resource group differ by K slots, K being an integer greater than or equal to 1.

Optionally, K=1.

Optionally, the first signal is an aperiodic CSI-RS for Tracking.

Optionally, the first configuration information is radio resource control RRC signaling, and the first indication information is downlink control information DCI signaling.

It should be understood that the above-mentioned and other operations and/or functions of the respective modules in the network device 500 according to the embodiment of the present application respectively aim to implement the corresponding processes of the network device in the method 300 in FIG. 3, and are not described herein for brevity.

Figure 6:
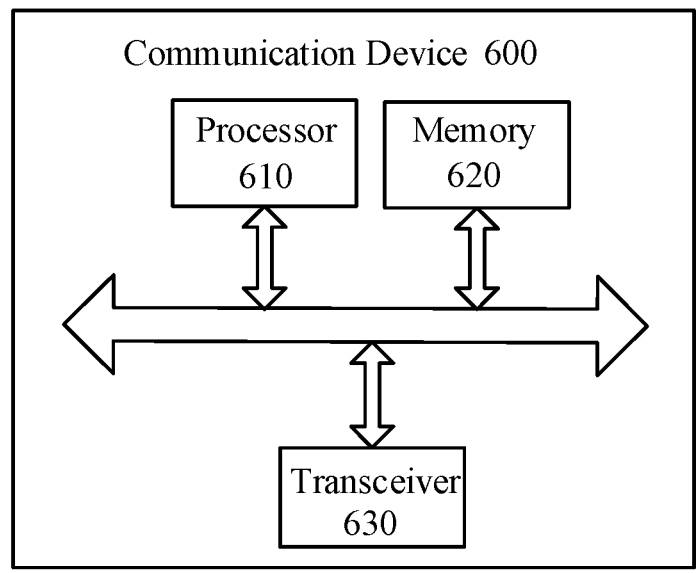
FIG. 6 is a schematic block diagram of a communication device in accordance with an embodiment of the present application.

FIG. 6 is a schematic block diagram of a communication device 600 in accordance with an embodiment of the present application. The communication device 600 shown in FIG. 6 includes a processor 610 that may invoke and run a computer program from a memory, to implement the methods in the embodiments of the present application.

Optionally, as shown in FIG. 6, the communication device 600 may further include a memory 620. The processor 610 may invoke and run a computer program from the memory 620 to implement the methods in the embodiments of the present application.

In the embodiment, the memory 620 may be a separate device independent of the processor 610 or may be integrated in the processor 610.

Optionally, as shown in FIG. 6, the communication device 600 may further include a transceiver 630. The processor 610 may control the transceiver 630 to communicate with other devices, in particular, the processor 610 may control the transceiver 630 to send information or data to other devices or receive information or data sent from other devices.

In the embodiment, the transceiver 630 may include a transmitter and a receiver. The transceiver 630 may further include an antenna, and the number of the antennas may be one or more.

Optionally, the communication device 600 may be the network device of the embodiment of the present application, and the communication device 600 may implement corresponding processes implemented by the network device in each method of the embodiment of the present application. For brevity, no further details are provided herein.

Optionally, the communication device 600 may be the terminal device of the embodiment of the present application, and the communication device 600 may implement corresponding processes implemented by the terminal device in the methods of the embodiments of the present application. For brevity, no further details are provided herein.

Figure 7:
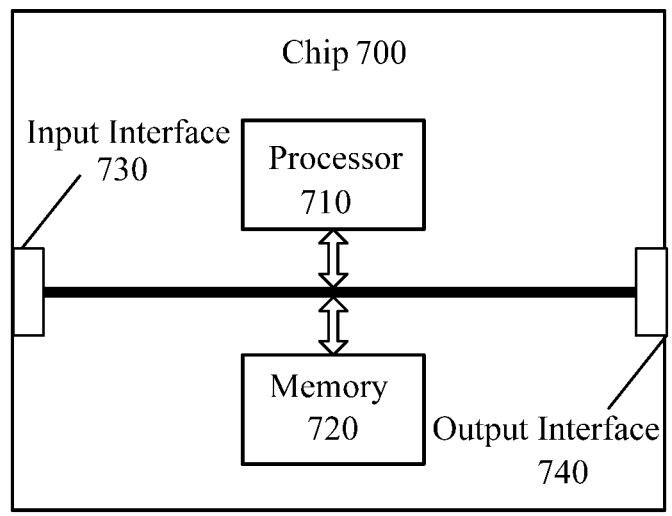
FIG. 7 is a schematic block diagram of a chip in accordance with an embodiment of the present application.

FIG. 7 is a schematic block diagram of a chip 700 in accordance with an embodiment of the present application. The chip 700 shown in FIG. 7 includes a processor 710 that may invoke and run a computer program from a memory to implement the methods in the embodiments of the present application.

Optionally, as shown in FIG. 7, the chip 700 may further include a memory 720. The processor 710 may invoke and run a computer program from the memory 720 to implement the methods in the embodiments of the present application.

In the embodiment, the memory 720 may be a separate device independent of the processor 710 or may be integrated in the processor 710.

Optionally, the chip 700 may further include an input interface 730. In the embodiment, the processor 710 may control the input interface 730 to communicate with other devices or chips. Specifically, the processor 710 may control the input interface 730 to acquire information or data sent by other devices or chips.

Optionally, the chip 700 may further include an output interface 740. In the embodiment, the processor 710 may control the output interface 740 to communicate with other devices or chips. Specifically, the processor 710 may control the output interface 740 to output information or data to other devices or chips.

Optionally, the chip may be applied to the network device in the embodiment of the present application, and the chip may implement corresponding processes implemented by the network device in each method of the embodiment of the present application. For brevity, no further details are provided herein.

Optionally, the chip may be applied to the terminal device in the embodiment of the present application, and the chip may implement corresponding processes implemented by the terminal device in each method of the embodiment of the present application. For brevity, no further details are provided herein.

It should be understood that the chip mentioned in the embodiment of the present application may also be referred to as a system level chip, a system chip, a chip system or a system on chip, or the like.

The processor mentioned above may be a general purpose processor, a digital signal processor (DSP), a field programmable gate array (FPGA), an application specific integrated circuit (ASIC) or other programmable logic device, transistor logic device, discrete hardware component, and the like. The above-mentioned general-purpose processor may be a microprocessor or may be any conventional processor or the like.

The memory mentioned above may be a volatile memory or a non-volatile memory, or may include both volatile and non-volatile memory. The non-volatile memory may be a read-only memory (ROM), a programmable ROM (PROM), an erasable PROM (EPROM), an electrically EPROM (EEPROM) or a flash memory. The volatile memory may be a random access memory (RAM).

It should be understood that the foregoing memory is exemplary but not limited. For example, the memory in the embodiment of the present application may also be a static RAM (SRAM), a dynamic RAM (DRAM), a synchronous DRAM (SDRAM), a double data rate SDRAM (DDR SDRAM), an enhanced SDRAM (ESDRAM), a synch link DRAM (SLDRAM) and a Direct Rambus RAM (DR RAM) and so on. In other words, the memory in the embodiments of the present application is intended to include, but is not limited to, these and any other suitable types of memory.

Figure 8:
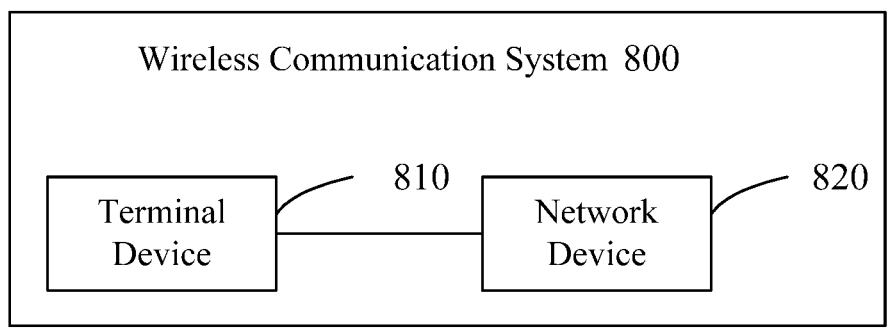
FIG. 8 is a schematic block diagram of a system for wireless communication in accordance with an embodiment of the present application.

FIG. 8 is a schematic block diagram of a system 800 for wireless communication in accordance with an embodiment of the present application. As shown in FIG. 8, the wireless communication system 800 includes a terminal device 810 and a network device 820. In the embodiment, the terminal device 810 is configured to perform a congestion control mechanism when a state of the terminal device changes. The network device 820 is configured to receive first request information sent by the terminal device when the state of the terminal device changes, wherein the first request information is used for requesting first service; and when the network is in a congestion state, send indication information to the terminal device, wherein the indication information is used for indicating that the terminal device performs a congestion control mechanism when requesting the first service.

In the embodiment, the terminal device 810 may be used for implementing the corresponding function implemented by the terminal device in the foregoing method 200, and the composition of the terminal device 810 may be that as shown in the terminal device 400 in FIG. 4, and is not described herein for brevity.

The network device 820 may be used for implementing the corresponding functions implemented by the network device in the foregoing method 300, and the composition of the network device 820 may be that as shown in the network device 500 in FIG. 5, and details are not described herein for brevity.

In the above embodiments, it may be implemented in whole or in part by software, hardware, firmware, or any combination thereof. When implemented in software, it may be implemented in whole or in part in the form of a computer program product. The computer program product includes one or more computer instructions. When the computer program instructions are loaded and executed on a computer, the processes or functions described in accordance with embodiments of the present application are generated in whole or in part. The computer may be a general purpose computer, a special purpose computer, a computer network, or other programmable device. The computer instructions may be stored in a computer readable storage medium or transferred from one computer readable storage medium to another computer readable storage medium. For example, the computer instructions may be transmitted from a website site, computer, server or data center to another website site, computer, server or data center through a wire (for example, coaxial cable, fiber optic, digital subscriber line (DSL)) or wireless (for example, infrared, wireless, microwave, or the like) manner. The computer readable storage medium may be any available media that may be accessed by a computer or a data storage device such as a server, data center, or the like that includes one or more available media. The usable medium may be a magnetic medium (e.g., a floppy disk, a hard disk, a magnetic tape), an optical medium (e.g., a DVD), or a semiconductor medium (such as a Solid State Disk (SSD)), or the like.

It should be understood that, in various embodiments of the present application, the sequence numbers of the foregoing processes does not mean the order of execution sequence. The order of execution of each process should be determined by its function and internal logic, and should not be taken to constitute any limitation to implementation processes of the embodiments of the present application.

A person skilled in the art may clearly understand that for the convenience and brevity of the description, the specific working process of the system, the device and the unit described above may refer to the corresponding process in the foregoing method embodiment, and details are not described herein again.

The above description is only the specific embodiment of the present application, but the scope of protection of the present application is not limited thereto. Any person skilled in the art may easily think of changes or substitutions within the technical scope of the present application and they should be covered within the protection scope of the present application. Therefore, the scope of protection of this application is subject to the protection scope of the claims.

What is claimed is:

1. An information determining method, the method comprising:
receiving, by a terminal device, first configuration information sent by a network device, wherein the first configuration information is used for configuring at least one Channel State Information Reference Signal (CSI-RS) resource group and used for indicating a first offset for the at least one CSI-RS resource group, each CSI-RS resource group comprises four CSI-RS resources, the at least one CSI-RS resource group is used for determining a first signal, wherein the first signal is an Aperiodic CSI-RS for Tracking, and the first signal occupies two slots;
receiving, by the terminal device, first indication information sent by the network device, wherein the first indication information is used for triggering the terminal device to receive the first signal; and
determining, by the terminal device in response to the first indication information, a first slot n according to the first offset, and determining a second slot n+1 based on the first slot n, the first offset being indicative of an offset between a slot at which the first indication information is located and the first slot n, where n is an integer greater than or equal to 0; and
receiving, by the terminal device according to a position sequence of the four CSI-RS resources in the first configuration information of the at least one CSI-RS resource group, the first signal on the first slot n and the second slot n+1, wherein first two CSI-RS resources of the four CSI-RS resources are in the first slot n and latter two CSI-RS resources of the four CSI-RS resources are in the second slot n+1, wherein the first configuration information is radio resource control (RRC) signaling, the position sequence of the four CSI-RS resources in the RRC signaling is ordered by CSI-RS resource identifiers such that a first CSI-RS resource is prior to a third CSI-RS resource and a fourth CSI-RS resource, and a second CSI-RS resource is prior to the third CSI-RS resource and the fourth CSI-RS resource.

2. The method according to claim 1, wherein the terminal device uses the first signal for tracking or synchronization of at least one of timing and frequency.

3. The method according to claim 1, wherein the first configuration information is further used for configuring a first indication parameter corresponding to the at least one CSI-RS resource group, the first indication parameter is used for indicating use of the at least one CSI-RS resource group.

4. The method according to claim 3, wherein the first indication parameter is a parameter trs-Info.

5. A terminal device, comprising:
a transceiver, configured to receive first configuration information sent by a network device, wherein the first configuration information is used for configuring at least one Channel State Information Reference Signal (CSI-RS) resource group and used for indicating a first offset for the at least one CSI-RS resource group, each CSI-RS resource group comprises four CSI-RS resources, the at least one CSI-RS resource group is used for determining a first signal, wherein the first signal is an Aperiodic CSI-RS for Tracking, and the first signal occupies two slots,
wherein the transceiver is further configured to receive first indication information sent by the network device, the first indication information is used for triggering the terminal device to receive the first signal; and
the transceiver is further configured to determine, in response to the first indication information, a first slot n according to the first offset, determine a second slot n+1 based on the first slot n, the first offset being indicative of an offset between a slot at which the first indication information is located and the first slot n, where n is an integer greater than or equal to 0, and receive, according to a position sequence of the four CSI-RS resources in the first configuration information of the at least one CSI-RS resource group, the first signal on the first slot n and the second slot n+1, wherein first two CSI-RS resources of the four CSI-RS resources are in the first slot n and latter two CSI-RS resources of the four CSI-RS resources are in the second slot n+1, and wherein the first configuration information is radio resource control (RRC) signaling, the position sequence of the four CSI-RS resources in the RRC signaling is ordered by CSI-RS resource identifiers such that a first CSI-RS resource is prior to a third CSI-RS resource and a fourth CSI-RS resource, and a second CSI-RS resource is prior to the third CSI-RS resource and the fourth CSI-RS resource.

6. The terminal device according to claim 5, wherein the first configuration information is further used for configuring a first indication parameter corresponding to the at least one CSI-RS resource group, the first indication parameter is used for indicating use of the at least one CSI-RS resource group.

7. The terminal device according to claim 6, wherein the first indication parameter is a parameter trs-Info.

* * * * *